(12) United States Patent
Chung et al.

(10) Patent No.: US 9,301,286 B2
(45) Date of Patent: Mar. 29, 2016

(54) METHOD AND APPARATUS FOR ALLOCATING AN UPLINK CARRIER FOR TRANSMITTING UPLINK CONTROL INFORMATION IN A WIRELESS COMMUNICATION SYSTEM

(75) Inventors: Jae Hoon Chung, Anyang-si (KR); Sung Ho Moon, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 13/388,921
(22) PCT Filed: Aug. 17, 2010
(86) PCT No.: PCT/KR2010/005416
§ 371 (c)(1),
(2), (4) Date: Feb. 3, 2012
(87) PCT Pub. No.: WO2011/021830
PCT Pub. Date: Feb. 24, 2011

(65) Prior Publication Data
US 2012/0127950 A1    May 24, 2012

Related U.S. Application Data

(60) Provisional application No. 61/234,615, filed on Aug. 17, 2009, provisional application No. 61/251,731, filed on Oct. 14, 2009.

(51) Int. Cl.
*H04W 4/00* (2009.01)
*H04W 72/04* (2009.01)
(Continued)

(52) U.S. Cl.
CPC .......... *H04W 72/0413* (2013.01); *H04L 5/0055* (2013.01); *H04L 5/0057* (2013.01); *H04W 72/0453* (2013.01); *H04W 72/00* (2013.01)

(58) Field of Classification Search
CPC ..................................................... H04W 72/04
USPC ....................................................... 370/329
See application file for complete search history.

(56) References Cited

U.S. PATENT DOCUMENTS 7,260,073 B2 *   8/2007   Sipola ........................... 370/329
8,396,030 B2 *   3/2013   Frederiksen et al. ......... 370/329
(Continued)

FOREIGN PATENT DOCUMENTS

CN    101395879 A    3/2009
CN    101465720 A    6/2009
(Continued)

OTHER PUBLICATIONS

Huawei, "PUCCH Design for Carrier Aggregation," 3GPP TSG RAN WG1 #55bis, R1-090126, Ljubljana, Slovenia, Jan. 12-16, 2009, (6 pages).

(Continued)

*Primary Examiner* — Christopher R Crompton
(74) *Attorney, Agent, or Firm* — Birch, Stewart, Kolasch & Birch, LLP

(57) ABSTRACT

The present invention relates to a wireless communication system. More particularly, the present invention relates to a method and apparatus for allocating an uplink carrier for transmitting uplink control information in a wireless communication system that supports carrier aggregation. According to one embodiment of the present invention, a method for transmitting uplink control information in a wireless communication system that supports carrier aggregation of M (M≥1) uplink component carriers comprises: a step of receiving setup information on a primary uplink component carrier, from among said M uplink component carriers, via which one or more pieces of uplink control information are to be transmitted; a step of multiplexing said one or more pieces of uplink control information; and a step of transmitting the multiplexed uplink control information through the primary uplink component carrier.

5 Claims, 16 Drawing Sheets

(51) Int. Cl.
*H04L 5/00* (2006.01)
*H04W 72/00* (2009.01)

(56) References Cited

U.S. PATENT DOCUMENTS

| | | |
|---|---|---|
| 2005/0265227 A1 | 12/2005 | Byun et al. |
| 2007/0183384 A1 | 8/2007 | Kwak et al. |
| 2010/0135273 A1 | 6/2010 | Kim |
| 2010/0172373 A1 | 7/2010 | Kimura et al. |
| 2010/0226326 A1 | 9/2010 | Ahn et al. |
| 2010/0234037 A1* | 9/2010 | Terry et al. .................. 455/450 |
| 2010/0271970 A1* | 10/2010 | Pan et al. ..................... 370/252 |
| 2010/0272048 A1* | 10/2010 | Pan et al. ..................... 370/329 |
| 2010/0290363 A1* | 11/2010 | Johansson et al. ............ 370/252 |
| 2011/0116455 A1* | 5/2011 | Damnjanovic et al. ....... 370/329 |

FOREIGN PATENT DOCUMENTS

| | | |
|---|---|---|
| KR | 10-2005-0114569 A | 12/2005 |
| KR | 10-2008-0088525 A | 10/2008 |
| KR | 10-2008-0095712 A | 10/2008 |
| KR | 10-2009-0075442 A | 7/2009 |
| WO | WO 2009/028095 A1 | 3/2009 |
| WO | 2010/123893 A1 | 10/2010 |

OTHER PUBLICATIONS

LG Electronics, "UE-Specific Carrier Assignment for LTE-Advanced," 3GPP TSG RAN WG1 Meeting #57, R1-092126, San Francisco, California, May 4-8, 2009, (3 pages).

ZTE, "Uplink Control Channel Design for LTE-Advanced", 3GPP TSG-RAN WG1 #57bis, R1-092464, San Francisco, USA, Jun. 29-Jul. 3, 2009, pp. 1-6.

LG Electronics, "UL control channel design to support carrier aggregation," 3GPP TSG RAN WG1 #56bis, R1-091204, Seoul, Korea, Mar. 23-27, 2009, 6 pages, XP050338819.

Zte, "Uplink Control Channel Design for LTE-Advanced," Tsg-Ran WG1 #57, R1-091702, San Francisco, USA, May 4-8, 2009, pp. 1-6, XP050339239.

* cited by examiner (a)

$n_{PRB} = N_{RB}^{UL} - 1$

| CQI | CQI |
|---|---|
| CQI+A/N | A/N |
|  | A/N |
|  |  |
| DATA | |
|  |  |

⋮

|  |  |
|---|---|
| DATA | |
|  |  |
| A/N |  |
| A/N | CQI+A/N |
| CQI | CQI |

$n_{PRB} = 0$

← One subframe →

METHOD AND APPARATUS FOR ALLOCATING AN UPLINK CARRIER FOR TRANSMITTING UPLINK CONTROL INFORMATION IN A WIRELESS COMMUNICATION SYSTEM

CROSS REFERENCE TO RELATED APPLICATIONS

This application is the National Phase of PCT/KR2010/005416 filed on Aug. 17, 2010, which claims priority under 35 U.S.C. 119 (e) to U.S. Provisional Application Nos. 61/234,615 and 61/251,731 filed on Aug. 17, 2009 and Oct. 14, 2009 respectively, all of which are hereby expressly incorporated by reference into the present application.

TECHNICAL FIELD

The present invention relates to a wireless communication system and, more particularly, to a method and apparatus for allocating an uplink carrier for transmitting uplink control information in a wireless communication system, which supports carrier aggregation.

BACKGROUND ART

In a general wireless communications system, even when the bandwidth for each of an uplink and a downlink is set up differently, only a single carrier is being taken into consideration. For example, based on the single (or unique) carrier structure, the number of carriers configuring each of the uplink and the downlink respectively corresponds to 1. And, accordingly, a wireless communications system, wherein the bandwidth of the uplink and the bandwidth of the downlink are generally symmetrical to one another, may be provided.

The ITU (International Telecommunication Union) is requesting the candidate technology of IMT-Advanced to support a more expanded bandwidth as compared to that of the conventional wireless communications system. However, with the exception for a select area throughout the world, there still exist many difficulties in allocating a large bandwidth frequency. Therefore, in order to resolve such difficulties, a carrier aggregation (also referred to as bandwidth aggregation or spectrum aggregation) technology is currently under development. The carrier aggregation technology corresponds to a technology developed for an efficient usage of small segmented bands. More specifically, a plurality of small bands is physically grouped in the frequency domain so that the group of segmented bands can be logically used as one large band.

The carrier aggregation technology is adopted so as to support an increasing throughput, to prevent an increase in the manufacturing cost caused by the addition of a broadband RF device, and to ensure backward compatibility with the conventional system. More specifically, carrier aggregation refers to a technology enabling a user equipment (or terminal) and a base station to exchange data to and from one another through multiple groups of carriers of a bandwidth unit defined by the conventional wireless communications system (e.g., the 3GPP LTE release 8 or 9 system in case of the 3GPP LTE-Advanced system). Herein, the carrier of the bandwidth unit defined by the conventional wireless communications system may be referred to as a component carrier (CC). For each of the uplink and downlink, a carrier aggregation technology using at least one or more component carriers (CCs) may be applied. The carrier aggregation technology may include a technology supporting a system bandwidth of up to a maximum of 100 MHz by grouping a maximum of 5 component carriers, even when one component carrier supports the bandwidth of 5 MHz, 10 MHz or 20 MHz.

DISCLOSURE

Technical Problem

A technical object of the present invention is to provide a method and apparatus for configuring an uplink component carrier enabling a transmitting end (a user equipment or a relay station), which performs uplink transmission, in a wireless communication system supporting carrier aggregation, to transmit uplink control information.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solution

In order to achieve the object of the present invention, according to an embodiment of the present invention, a method for transmitting uplink control information in a wireless communication system supporting carrier aggregation of M (M≥1) number of uplink component carriers includes the steps of receiving configuration information for an uplink primary component carrier, through which uplink control information is to be transmitted, among the M number of uplink component carriers; multiplexing one or more the uplink control information; and transmitting the multiplexed uplink control information through the uplink primary component carrier.

Also, the uplink primary component carrier may correspond to an uplink component carrier for transmitting the uplink control information through a physical uplink control channel (PUCCH).

Also, the uplink primary component carrier may be configured as a single uplink transmission entity-specific uplink component carrier.

Also, the step of multiplexing one or more the uplink control information may include multiplexing one or more the uplink control information through a physical uplink control channel (PUCCH) or through a physical uplink shared channel (PUCCH).

Also, the step of multiplexing one or more the uplink control information may include at least one of multiplexing uplink control information of the same type and multiplexing uplink control information of different types.

Also, the uplink control information may include at least one of ACK/NACK information, channel status information (CSI), and scheduling request (SR).

Also, the configuration information may be received through RRC signaling or L1/L2 control signaling.

Also, the configuration information may correspond to information directly configuring the uplink primary component carrier, or to information being indirectly derived from information configuring a downlink primary component carrier.

In order to achieve the object of the present invention, according to another embodiment of the present invention, a user equipment for transmitting uplink control information in a wireless communication system supporting carrier aggregation of M (M≥1) number of uplink component carriers includes a receiving unit configured to receive downlink signals; a transmitting unit configured to transmit uplink signals; and a processing unit configured to be connected to the receiving unit and the transmitting unit and to control operations of the user equipment, wherein the processor receives configuration information for an uplink primary component carrier, through which uplink control information is to be transmitted, among the M number of uplink component carriers, by using the receiving module, multiplexes one or more the uplink control information, and transmits the multiplexed uplink control information through the uplink primary component carrier, by using the transmitting module.

The above-described general description of the present invention and the detailed description that will follow are merely exemplary and are, therefore, given to provide additional description of the appended claims of the present invention.

Advantageous Effects

According to the exemplary embodiments of the present invention, the present invention may provide a method and apparatus for efficiently configuring an uplink component carrier enabling a transmitting end (a user equipment or a relay station), which performs uplink transmission, in a wireless communication system adopting the carrier aggregation technology, to transmit uplink control information.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

DESCRIPTION OF DRAWINGS

The accompanying drawings, which are included to provide a further understanding of the invention and are incorporated in and constitute a part of this application, illustrate embodiments of the invention and along with the description serve to explain the spirit and scope (or principle) of the invention.

FIG. 6 illustrates an exemplary resource mapping structure of a PUCCH in an uplink physical resource block.

BEST MODE

Figure 1:
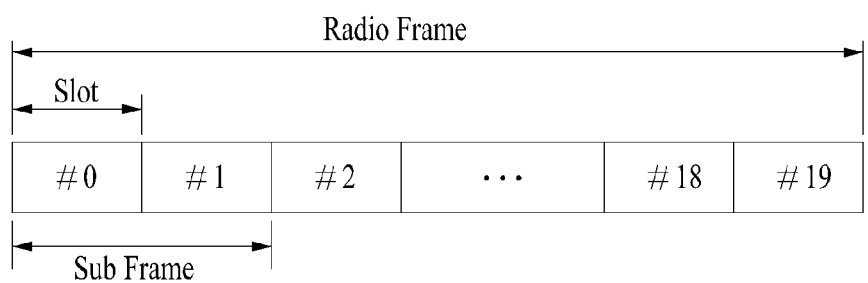
FIG. 1 illustrates an exemplary structure of a radio frame being used in a 3GPP LTE system.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or network nodes other than the base station. Herein, the term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system.

Nevertheless, the scope and spirit of the present invention will not be limited only to those of the 3GPP LTE system and the 3GPP LTE-A system.

FIG. 1 illustrates a structure of a radio frame being used in a 3GPP LTE system. Herein, one radio frame includes 10 subframes, and each subframe includes 2 slots in a time domain. The time consumed (or taken) for transmitting one subframe may be defined by a Transmission Time Interval (TTI). And, for example, one subframe may have the length of 1 ms, and one slot may have the length of 0.5 ms. In the time domain, one slot may include a plurality of OFDM symbols in a time domain. Since the 3GPP LTE system uses the OFDMA scheme in a downlink transmission, the OFDM symbol may indicate one symbol period. In an uplink transmission, one symbol may also be referred to as an SC-FDMA symbol or a symbol period. A Resource Block (RB) corresponds to a resource allocation unit, and one Resource Block may include a plurality of consecutive subcarriers in one slot. Herein, the above-described structure is merely exemplary. And, therefore, the number of subframes included in one radio frame, the number of slots included in a subframe, or the number of OFDM symbols included in one slot may be varied by using diverse methods.

Figure 2:
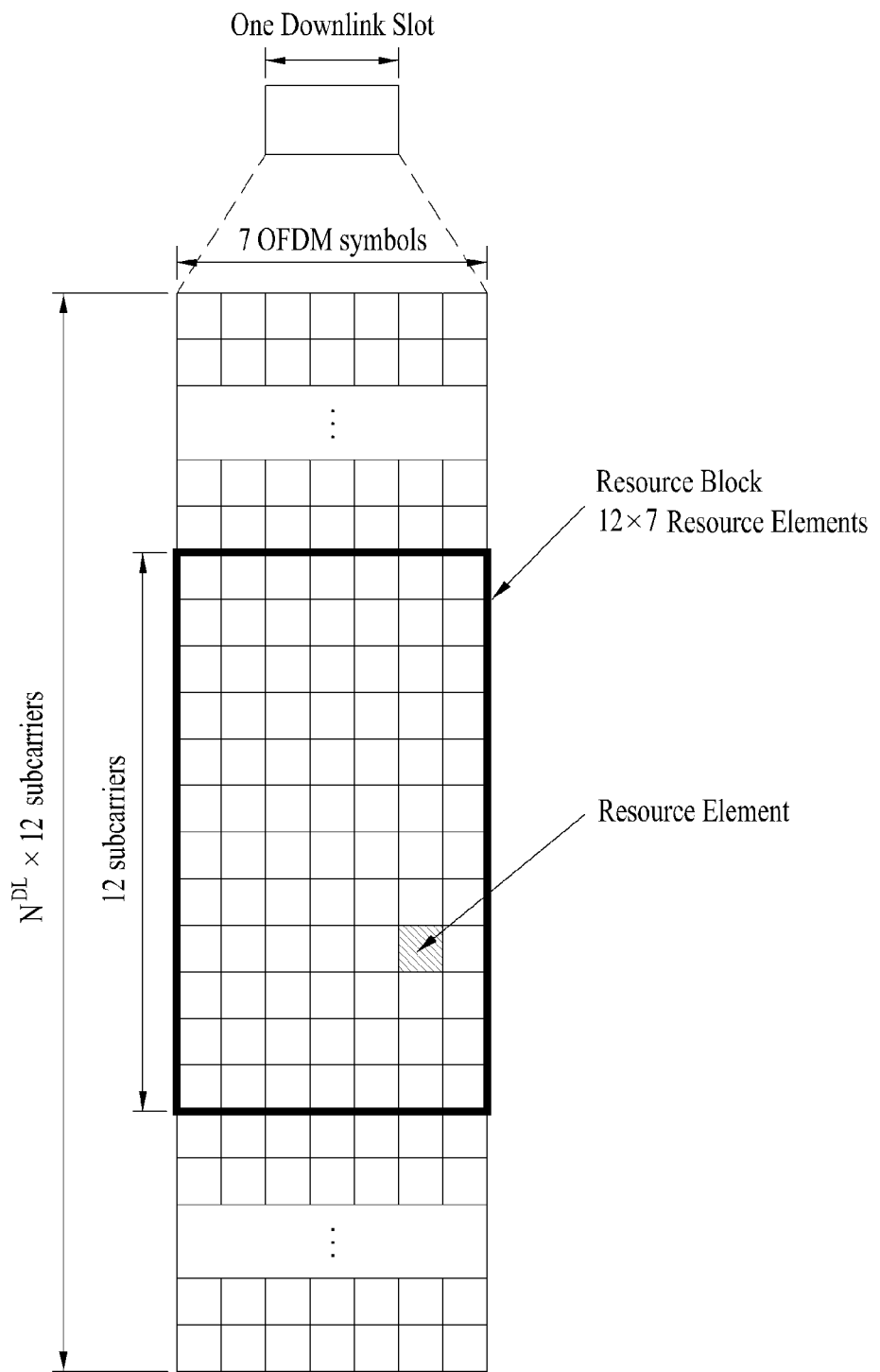
FIG. 2 illustrates a resource grid in a downlink slot.

FIG. 2 illustrates a resource grid in a downlink slot. Herein, although FIG. 2 shows an example of one downlink slot including 7 OFDM symbols in the time domain and of one resource block (RB) including 12 subcarriers in a frequency domain, the present invention will not be limited only to the example presented herein. For example, in case of a normal CP (Cyclic Prefix), one slot may include 7 OFDM symbols. However, in case of an extended CP (Cyclic Prefix), one slot may include 6 OFDM symbols. Herein, each element within a resource grid is referred to as a resource element (RE). And, one resource block includes 12×7 resource elements. And, $N^{DL}$ number of resource blocks included in a downlink slot is in accordance with the downlink transmission bandwidth. The structure of an uplink slot may be identical to the structure of a downlink slot.

Figure 3:
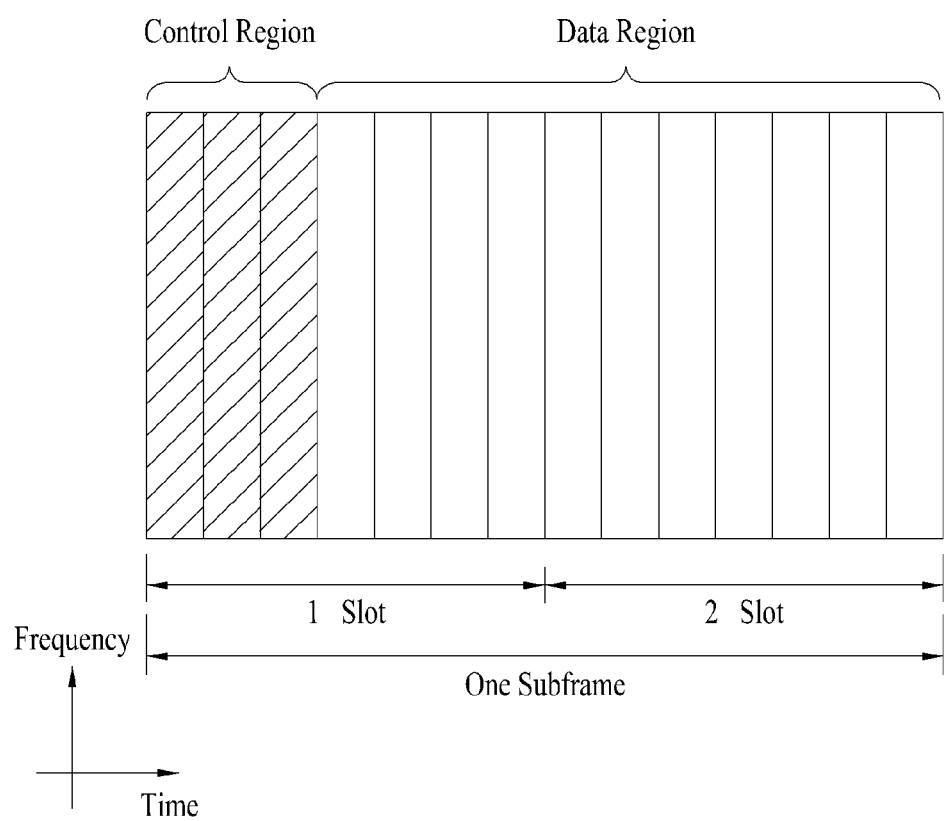
FIG. 3 illustrates an exemplary structure of a downlink subframe.

FIG. 3 illustrates the structure of a downlink subframe. In a subframe, a maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Chancel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a sub-frame and being used in the control channel transmission within the sub-frame. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to system information (more specifically, if the PDCCH belongs to a system information block (SIB)), a system information identifier and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 4:
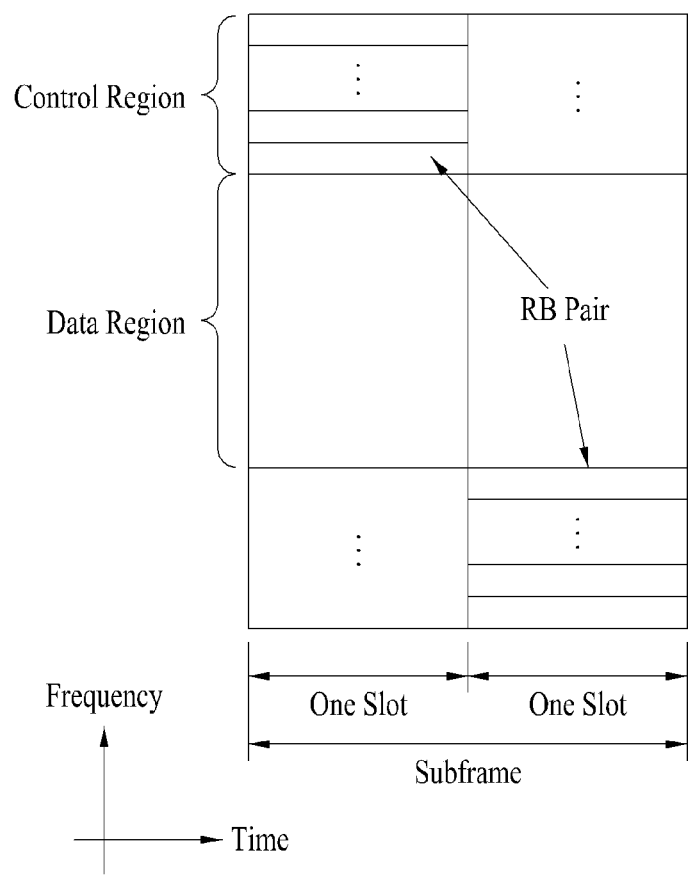
FIG. 4 illustrates an exemplary structure of an uplink subframe.

FIG. 4 illustrates the exemplary structure of an uplink subframe. In a frequency domain, an uplink sub-frame may be divided into a control region and a data region. A Physical Uplink Control Channel (PUCCH) including uplink control information is allocated to the control region. And, a Physical uplink shared channel (PUSCH) including user data is allocated to the data region. In order to maintain the characteristic of a unique (or single) carrier, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This state may be referred to as the resource block pair, which is allocated to the PUCCH, as being "frequency-hopped" at the slot boundary.

Carrier Aggregation

Hereinafter, the Carrier Aggregation (CA) technique will be described in detail. For carriers (also referred to as component carriers or carrier bands and, in the present invention, may be collectively referred to as carriers) that are each separately designated for an uplink or a downlink, Carrier Aggregation, which is a technology that is being considered for adoption in an evolved OFDM based mobile communication system, may refer to a technique for simultaneously transmitting data or control information from a downlink transmission entity (base station (cell) or relay node (or relay station)) via downlink, or for simultaneously transmitting data or control information from an uplink transmission entity (user equipment or relay station) via uplink. In the following description of the present invention, an uplink component carrier is simply marked as a UL CC, and a downlink component carrier is simply marked as a DL CC.

Also, in the following description of the present invention, a base station (or cell) will mainly be given as an example of the downlink transmission entity, and a user equipment will mainly be given as an example of the uplink transmission entity. However, the present invention will not be limited to the examples given herein. More specifically, the details of the present invention may also be applied to cases when a relay station acts as the downlink transmission entity to the user equipment or as the uplink reception entity from the user equipment, or when the relay station acts as the uplink transmission entity to the base station or as the downlink reception entity from the base station.

A downlink carrier aggregation may be described as the base station supporting downlink transmission to the user equipment by using a frequency domain resource (a sub-carrier or PRB (Physical Resource Block)) of at least one or more sub-carrier bands within a time domain resource (a sub-frame unit). And, an uplink carrier aggregation may be described as the user equipment supporting uplink transmission to the base station by using a frequency domain resource (a sub-carrier or PRB) of at least one or more sub-carrier bands within a time domain resource (a sub-frame unit).

Figure 5:
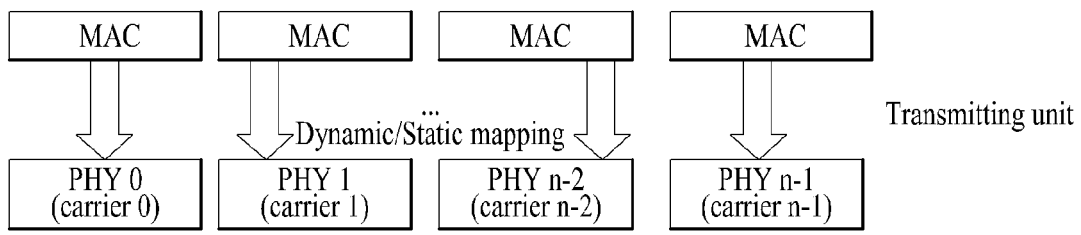
FIG. 5 illustrates an exemplary description of a physical layer (L1) and MAC layer (L2) configuration in a multi-carrier supporting system.
Figure 5:
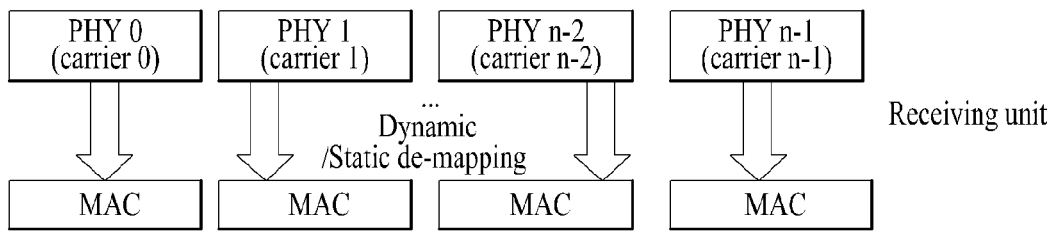
Figure 5:
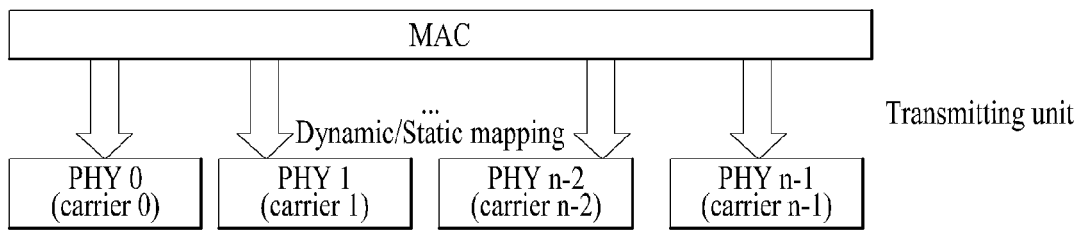
Figure 5:
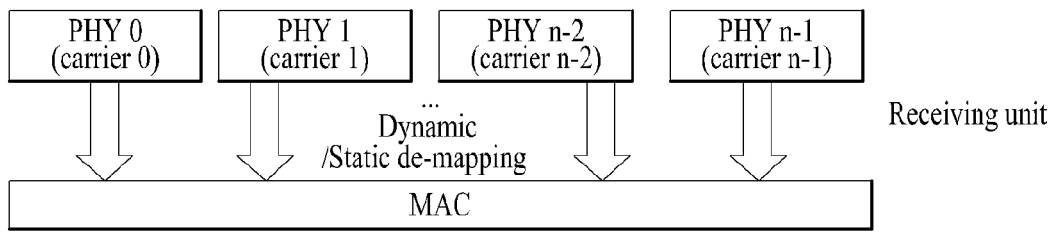

The configuration of a physical layer ($1^{st}$ layer, L1) and a MAC layer ($2^{nd}$ layer, L2) of a multi-carrier supporting system will hereinafter be described in detail with reference to FIG. 5. A base station of the conventional wireless communication system, which supports a single carrier, includes one physical layer (PHY) entity supporting one carrier, and one MAC (Medium Access Control) entity for controlling one PHY entity may also be provided in the base station. For example, in the PHY layer, a baseband processing operation may be performed. And, for example, in the MAC layer, a receiving unit may generate a MAC PDU (Protocol Data Unit) and may perform operations of an L1/L2 scheduler including MAC/RLC sub-layers. A MAC PDU packet block of the MAC layer passes through a logical transport layer so as to be converted to a transport block, thereby mapped to a physical layer input information block.

Meanwhile, in a multi-carrier supporting system, a plurality of MAC-PHY entities may be provided. More specifically, as shown in FIG. 5(a), a transmitter and a receiver of the multi-carrier supporting system may be configured to have one MAC-PHY entity corresponding each of n number of component carriers. Since an independent PHY layer and an independent MAC layer are configured for each component carrier, a PDSCH may be generated for each component carrier in the physical layer from the MAC PDU.

Alternatively, a multi-carrier supporting system may also be configured by using a single common MAC entity and a plurality of PHY entities. More specifically, as shown in FIG. 5(b), a transmitter and a receiver of the multi-carrier supporting system may be configured to have n number of PHY entities respectively correspond to each of the n number of component carriers and to have one common MAC entity control the n number of PHY entities. In this case, a MAC PDU from a single MAC layer may be divided into a plurality of transport blocks each corresponding to the plurality of component carriers within the transport layer. Alternatively, when generating a MAC PDU in the MAC layer, or when generating an RLC PDU in an RLC layer, the PDU may be divided with respect to each component carrier. Accordingly, a PDSCH may be generated for each component carrier within the physical layer.

The PDCCH, which transmits control information for L1/L2 control signaling generated from a packet scheduler of the MAC layer, may be mapped to a physical resource for each separate component carrier, thereby being transmitted. Herein, the PDCCH, which includes control information (downlink allocation or uplink grant) for the PDSCH or PUSCH transmission for a specific user equipment, may be separately encoded for each component carrier to which the corresponding PDSCH/PUSCH is transmitted. Such PDCCH may be referred to as a separate coded PDCCH. Meanwhile, control information for PDSCH/PUSCH transmission of multiple component carriers may be configured as a single PDCCH so as to be transmitted. And, such PDCCH may be referred to as a joint coded PDCCH.

In order to support carrier aggregation, a connection between the base station and the user equipment is required to be set up, or a preparation for a connection set-up between the base station and the user equipment (or relay station) is required to be made, so that a control channel (PDCCH or PUCCH) and/or a shared channel (PDSCH or PUSCH) can be transmitted. In order to perform such connection/connection set-up for each specific user equipment (or relay station), a measurement and/or reporting process on the carrier is required to be performed. And, component carriers corresponding to the targets of such carrier measurement and/or reporting, may be assigned (or allocated). More specifically, component carrier assignment refers to setting up component carriers (i.e., designating number component carriers and component carrier index) that are used for uplink/downlink transmissions, among the uplink/downlink component carriers configured in the base station, while taking into consideration the capability of the specific user equipment (or relay station) and the system environment.

At this point, when a $3^{rd}$ layer (L3) RRM (Radio Resource Management) controls component carrier assignment, UE-specific or RN-specific RRC signaling may be used. Alternatively, cell-specific or cell cluster-specific RRC signaling may also be used. When a dynamic control is required when performing component carrier allocation, a predetermined PDCCH may be used for L1/L2 control signaling, or a physical control channel dedicated to component carrier assignment control information or a PDSCH configured in an L2 MAC message format may also be used. Meanwhile, when a packet scheduler controls the component carrier assignment (or allocation), a predetermined PDCCH may be used for L1/L2 control signaling, or a physical control channel dedicated to component carrier assignment control information may be used, or a PDSCH configured in an L2 MAC message format may be used.

Physical Uplink Control Channel (PUCCH)

Hereinafter, a physical uplink control channel (PUCCH) including uplink control information will be described in more detail.

The PUCCH may be modulated by using a BPSK (Binary Phase Shift Keying) scheme and a QPSK (Quadrature Phase Shift Keying) scheme. Control information of multiple user equipments may be transmitted through the PUCCH, and, when performing Code Division Multiplexing (CDM) in order to identify (or differentiate) the signal of each user equipment, 12 CAZAC (Constant Amplitude Zero Autocorrelation) sequences are mainly used. Since a CAZAC sequence has the characteristic of maintaining a constant amplitude in a time domain and a frequency domain, the CAZAC sequence is most appropriate for decreasing a PAPR (Peak-to-Average Power Ratio) or CM (Cubic Metric) of a user equipment so as to increase the coverage. Also, ACK/NACK information respective to a downlink data transmission, which is transmitted through the PUCCH, may be covered by using an orthogonal sequence.

Also, control information that is being transmitted over the PUCCH may be identified (or differentiated from one another) by using a cyclically shifted sequence including different cyclic shift values. The cyclically shifted sequence may be generated by cyclically shifting a base sequence as much as a specific CS (cyclic shift) amount. The specific CS amount is indicated by a cyclic shift (CS) index. A number of available cyclic shifts may be varied depending upon a delay spread of a channel. Various types of sequences may be used as the base sequence, and one of the examples corresponds to the above-described CAZAC sequence.

The PUCCH may include control information, such as a Scheduling Request (SR), downlink channel measurement information, and ACK/NACK information on a downlink data transmission. The channel measurement information may include a Channel Quality Indicator (CQI), a Precoding Matrix Index (PMI), and a Rank Indicator (RI).

A PUCCH format may be defined in accordance with the type of control information, demodulation scheme, and so on, included in the PUCCH. More specifically, PUCCH format 1 is used for SR transmission, PUCCH format 1a or format 1b is used for HARQ ACK/NACK transmission, PUCCH format 2 is used for CQI transmission, and PUCCH format 2a/2b is used for CQI and HARQ ACK/NACK transmission.

In a random subframe, when the HARQ ACK/NACK is independently transmitted, PUCCH format 1a or format 1b may be used, and when the SR is independently transmitted, PUCCH format 1 may be used. The user equipment may transmit the HARQ ACK/NACK and the SR through the same subframe, and this will be described later on in more detail.

The PUCCH format may be described in the form of a table as shown in Table 1 below.

TABLE 1

| PUCCU format | Modulation scheme | Number of bits per subframe | Usage | etc. |
|---|---|---|---|---|
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

FIG. 6 illustrates a resource mapping structure of a PUCCH in an uplink physical resource block. $N_{RB}^{UL}$ represents a number of resource blocks in an uplink, and $n_{PRB}$ signifies a physical resource block number. The PUCCH is mapped to each edge of the uplink frequency block. A CQI resource may be mapped to a physical resource block that immediately follows the end of the frequency band, and the ACK/NACK may be mapped to a position following the CQI resource.

Hereinafter, PUCCH formats will be described in more detail.

Before describing the PUCCH format 1, the PUCCH formats 1a and 1b will first be described in detail. PUCCH formats 1a/1b each corresponds to a control channel that is used for ACK/NACK transmission.

In the PUCCH formats 1a/1b, a symbol that is modulated by using the BPSK or QPSK modulation schemes is multiplied a length-12 CAZAC sequence. After multiplying the corresponding symbol by the CAZAC sequence, the processed symbol is dispersed block-wise in the form of an orthogonal sequence. A length-4 Hadamard sequence is used for a general ACK/NACK information, and a length-3 DFT (Discrete Fourier Transform) sequence is used for a shortened ACK/NACK information and a Reference Signal information. In case of an extended CP, a length-2 Hadamard sequence may be used on the reference signal.

Figure 7:
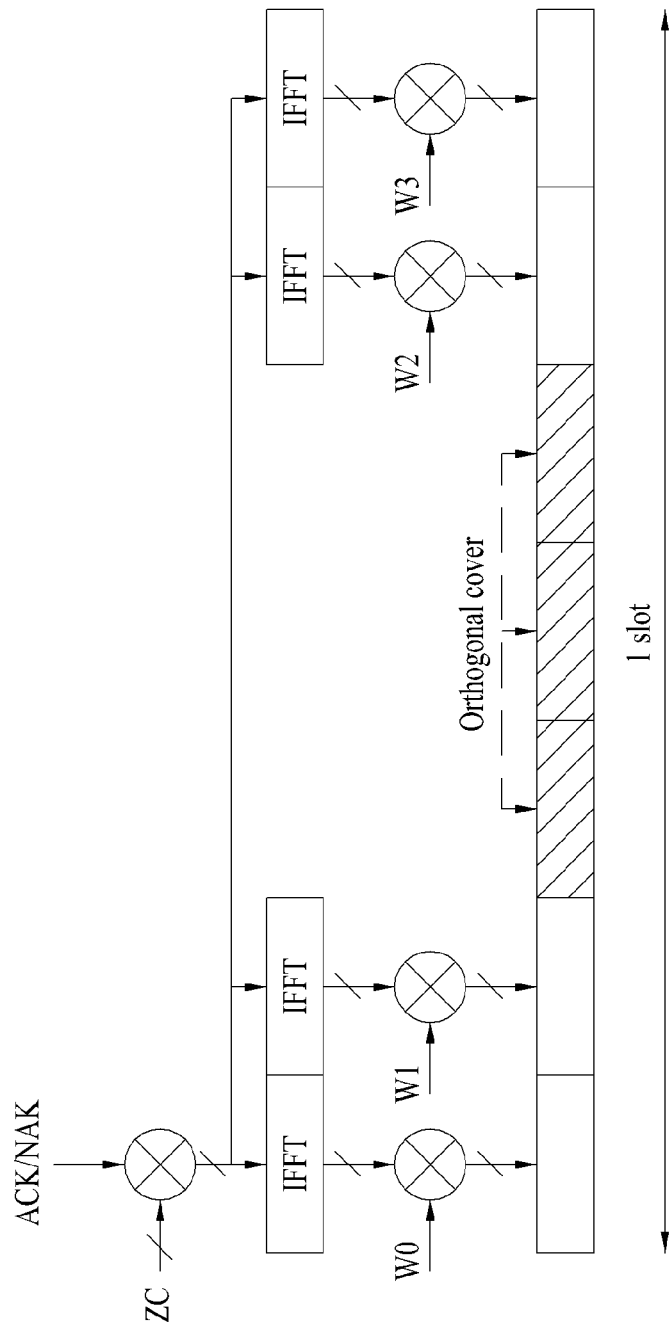
FIG. 7 illustrates an exemplary structure of an ACK/NACK channel in case of a normal CP.

FIG. 7 illustrates an exemplary structure of an ACK/NACK channel in case of a normal CP. Among the 7 OFDM symbols that are included in one slot, 3 consecutive (or contiguous) symbols located in the middle portion of the 7 OFDM symbols may carry a reference signal (RS), and the remaining 4 OFDM symbols may carry an ACK/NACK signal. The number of symbols that are used for the RS and the positions of the corresponding symbols may vary depending upon the control channel. And, accordingly, the number of symbols that are used for the related ACK/NACK signal and the positions of such symbols may also vary respectively. In a normal CP, the number of available ACK/NACK channels per resource block may be equal to 12, 18, or 36. And, in an extended CP, the number of available ACK/NACK channels per resource block may be equal to 8 or 12.

When transmitting a control signal within an assigned band, a 2-dimensional dispersion is applied in order to enhance the multiplexing capacity. More specifically, in order to increase the number of user equipments or in order to increase the number of control channels, frequency domain dispersion and time domain dispersion may be applied at the same time. In order to distribute (or disperse) the ACK/NACK signal in the frequency domain, a frequency domain sequence may be used as the basic sequence. Among the CAZAC sequences, a Zadoff-Chu (ZC) sequence may be used as the frequency domain sequence. The frequency domain dispersed ACK/NACK signal is processed with IFFT, so as to be dispersed in the time domain by using a time domain sequence. For example, the ACK/NACK signal may be dispersed by using a length-4 orthogonal sequence (w0, w1, w2, w3) with respect to 4 symbols. Additionally, the RS is also dispersed through a length-3 orthogonal sequence. This is referred to as orthogonal covering.

Examples of the sequences that are used for the dispersion of ACK/NACK information are shown in Table 2 and Table 3. Herein, Table 2 shows a sequence for a length-4 symbol, and Table 3 shows a sequence for a length-3 sequence. The sequence for the length-4 symbol is used in PUCCH formats 1/1a/1b corresponding to a general subframe configuration. Based upon a case of an SRS (Sounding Reference Signal) being transmitted from the last symbol of a second slot, within the subframe configuration, the sequence for the length-4 symbol is applied in the first slot, and a shortened PUCCH format 1/1A/1B of the sequence for the length-3 symbol may be applied in the second slot.

TABLE 2

| Sequence index | [w(0), w(1), w(2), w(3)] |
|---|---|
| 0 | [+1  +1  +1  +1] |
| 1 | [+1  −1  +1  −1] |
| 2 | [+1  −1  −1  +1] |

TABLE 3

| Sequence index | [w(0), w(1), w(2)] |
|---|---|
| 0 | [1  1  1] |
| 1 | [1  $e^{j2\pi/3}$  $e^{j4\pi/3}$] |
| 2 | [1  $e^{j4\pi/3}$  $e^{j2\pi/3}$] |

Meanwhile, an example of an orthogonal sequence being used in an RS dispersion of an ACK/NACK channel is shown in Table 4 below.

TABLE 4

| Sequence index | Normal CP | Extended CP |
|---|---|---|
| 0 | [1  1  1] | [1  1] |
| 1 | [1  $e^{j2\pi/3}$  $e^{j4\pi/3}$] | [1  −1] |
| 2 | [1  $e^{j4\pi/3}$  $e^{j2\pi/3}$] | N/A |

Figure 8:
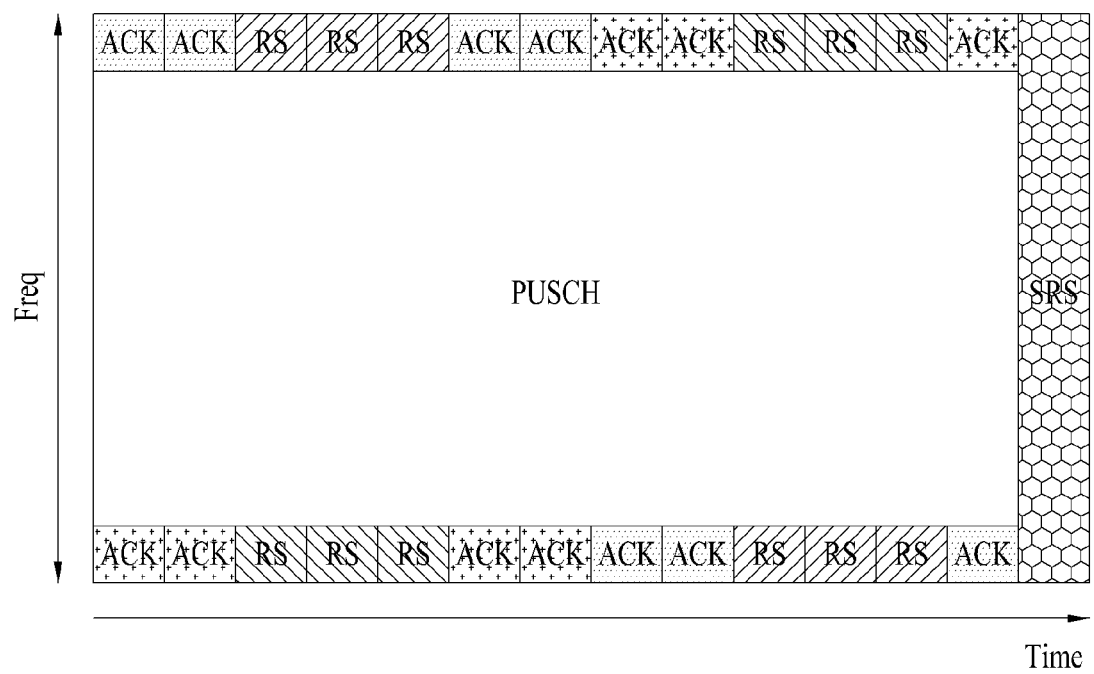
FIG. 8 illustrates a resource mapping structure in a case when a shortened ACK/NACK format is being applied.

FIG. 8 illustrates a resource mapping structure in a case when a shortened ACK/NACK format is being applied. The shortened ACK/NACK format is used in a case when an ACK/NACK and a Sounding Reference Signal (SRS) are required to be transmitted simultaneously. The shortened ACK/NACK format may be configured by using an upper layer (or higher-level layer) signaling.

Hereinafter, the PUCCH format 1 will be described in detail. Herein, the PUCCH format 1 corresponds to a control channel that is used for SR transmission.

A Scheduling Request (SR) is transmitted by a user equipment, which sends a request to be scheduled or which does not send a request to be scheduled. An SR channel reuses the ACK/NACK channel structure of PUCCH formats 1a/1b, and the SR channel is configured by using an OOK (On-Off Keying) method based upon an ACK/NACK channel design. In the SR channel, a reference signal is not transmitted. Therefore, in case of a normal CP, a length-7 sequence is used, and, in case of an extended CP, a length-6 sequence is used. Herein, different cyclic shifts or orthogonal covers may be assigned to the SR and the ACK/NACK.

Figure 9:
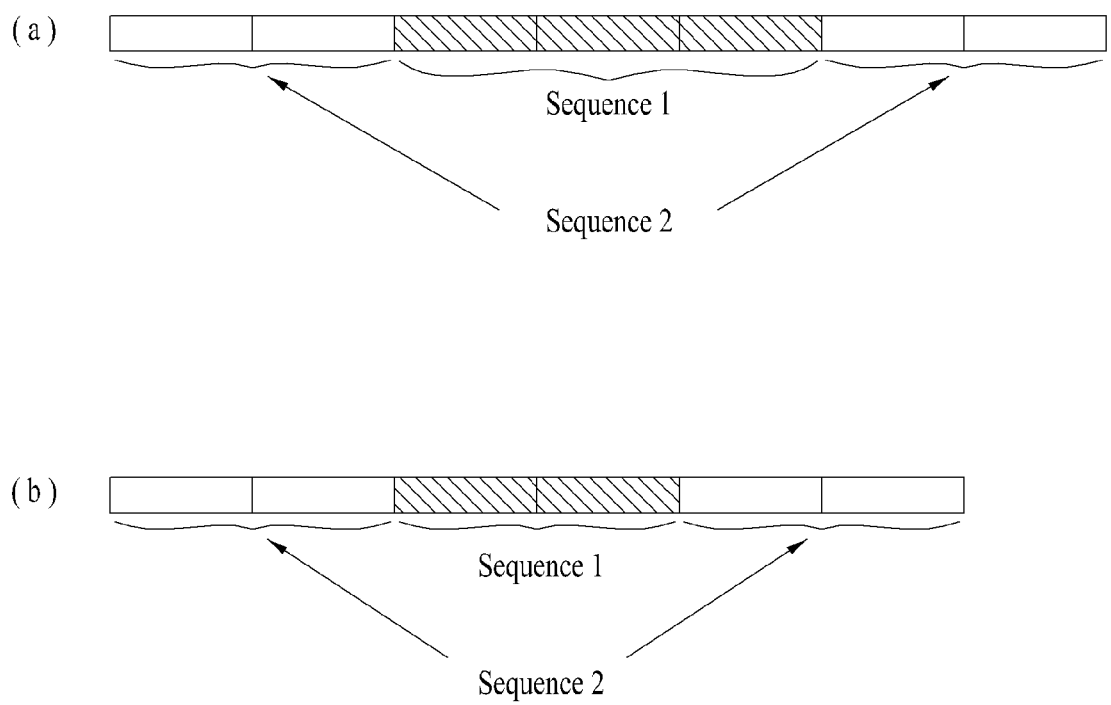
FIG. 9 illustrates an exemplary structure of an SR channel within a single slot.

FIG. 9 illustrates an exemplary structure of an SR channel within a single slot. Referring to FIG. 9(*a*), in case of a normal CP, the length-7 sequence is divided into 2 orthogonal sequences (Sequence 1 and Sequence 2). And, referring to FIG. 9(*b*), in case of an extended CP, the length-6 sequence is also divided into 2 orthogonal sequences (Sequence 1 and Sequence 2).

Figure 10:
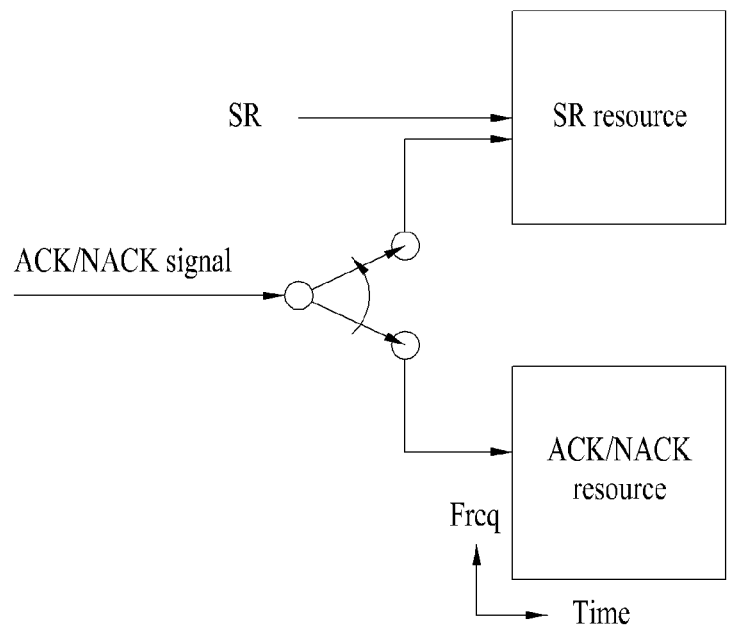
FIG. 10 illustrates a case when ACK/NACK information and an SR are simultaneously transmitted.

A case when ACK/NACK information and an SR are simultaneously transmitted will be described in detail with reference to FIG. 10. As described above, the user equipment may transmit an HARQ ACK/NACK and an SR from the same subframe. In order to transmit a positive SR, the user equipment transmits an HARQ ACK/NACK through an assigned resource dedicated to an SR. In order to transmit a negative SR, the user equipment transmits an HARQ ACK/NACK through an assigned resource dedicated to an ACK/NACK.

Hereinafter, the PUCCH formats 2/2a/2b will be described in detail. Herein, each of the PUCCH formats 2/2a/2b corresponds to a control channel that is used for transmitting channel measurement feedback (CQI, PMI, RI).

The PUCCH formats 2/2a/2b support modulation performed by using CAZAC sequences. And, the QPSK-modulated symbol is multiplied by a length-12 CAZAC sequence. The cyclic shift of the sequence may vary between symbols and slots. Herein, orthogonal covering is used for reference signals (RSs).

Figure 11:
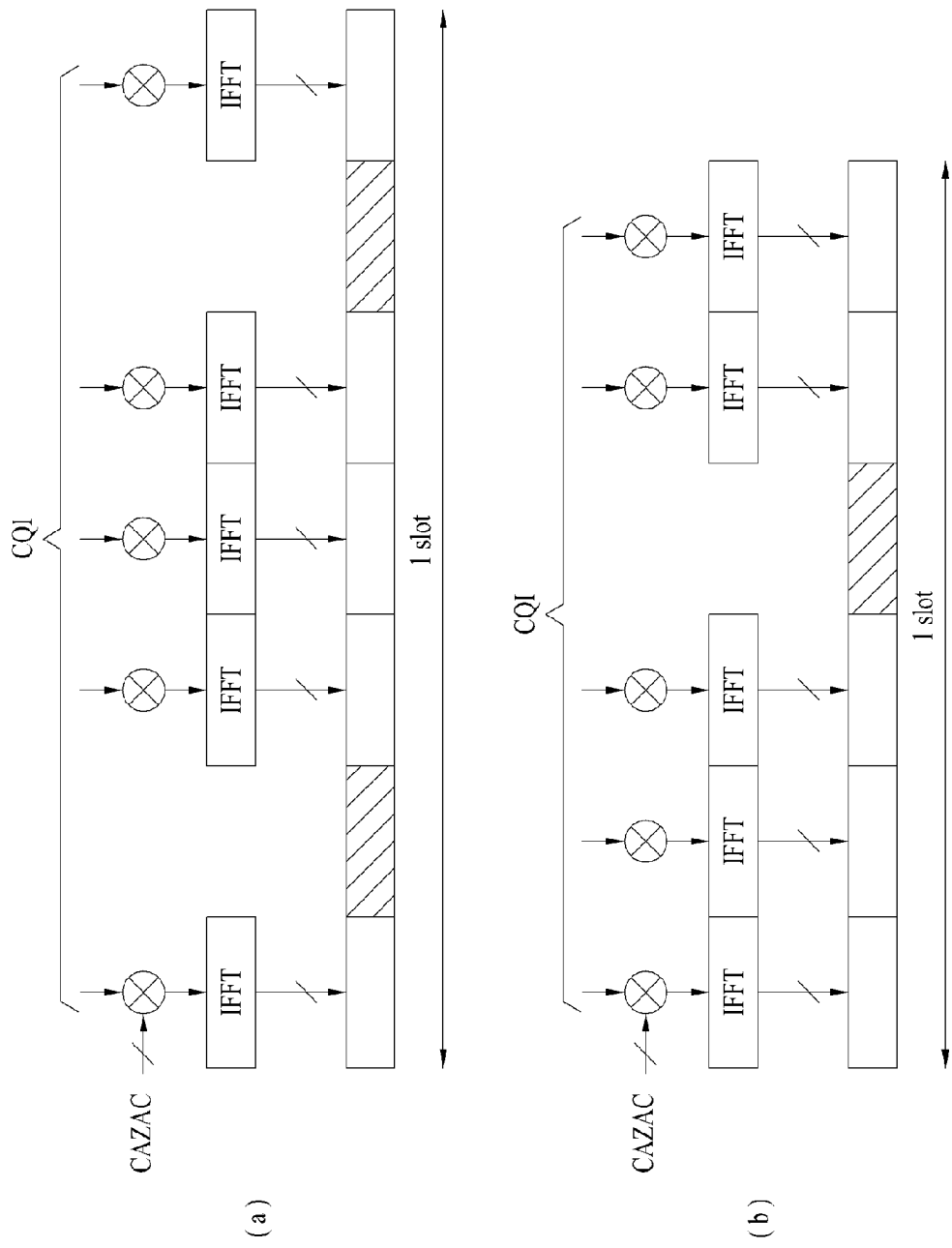
FIG. 11 illustrates a channel structure of a CQI information bit.

FIG. 11 illustrates a channel structure of a CQI information bit. Herein, the CQI information bit may include at least one or more bits. For example, a CQI field indicating a CQI index for deciding an MCS, a PMI field indicating the index of a precoding matrix over a code book, an RI field indicating a rank, and so on may be included in the CQI information bit.

Referring to FIG. 11(*a*), among 7 SC-FDMA symbols included in a single slot, a reference signal (RS) is carried over 2 SC-FDMA symbols, which are spaced apart from one another by an interval of 3 SC-FDMA symbols. And, CQI information is carried over the remaining 5 SC-FDMA symbols. 2 RSs are used in a single slot in order to support a high-speed user equipment. Also, each user equipment may be differentiated from one another by using a sequence. The CQI information symbols are modulated to the entire SC-FMDA symbols, so as to be transmitted. And, herein, the SC-FDMA symbol is configured of one sequence. More specifically, the user equipment modulates the CQI to each sequence, so as to transmit the CQI.

Herein, 10 symbols may be transmitted to a single TTI, and the modulation of the CQI information is decided to up to QPSK. When using QPSK mapping on the SC-FDMA symbols, 2-bit CQI values may be loaded (or carried). Therefore, a 10-bit CQI value may be carried over one slot. Therefore, one subframe may carry a maximum CQI value of 20 bits. In order to disperse the CQI information in the frequency domain, frequency domain dispersion code is used.

A CAZAC sequence (e.g., ZC sequence) may be used as the frequency domain dispersion code. Also, another sequence having an excellent correlation characteristic may also be applied as the frequency domain dispersion code. Most particularly, each control channel may be differentiated from one another by applying CAZAC sequences each having a different cyclic shift value. Herein, IFFT is performed on the frequency domain dispersed CQI information.

FIG. 11(b) illustrates an exemplary PUCCH formats 2/2a/2b, in case of an extended CP. Herein, one slot includes 6 SC-FDMA symbols. Among the 6 OFDM symbols of each slot, 1 OFDM symbol carries an RS, and CQI information bits are carried over the remaining 5 OFDM symbols. With the exception for the above-described configuration, the example of the normal CP shown in FIG. 11(a) may be identically applied herein.

The orthogonal covering used for the RS, as shown in FIG. 11(a) and FIG. 11(b), is shown in Table 5 below.

TABLE 5

| Normal CP | Extended CP |
|---|---|
| [1　1] | [1] |

Figure 12:
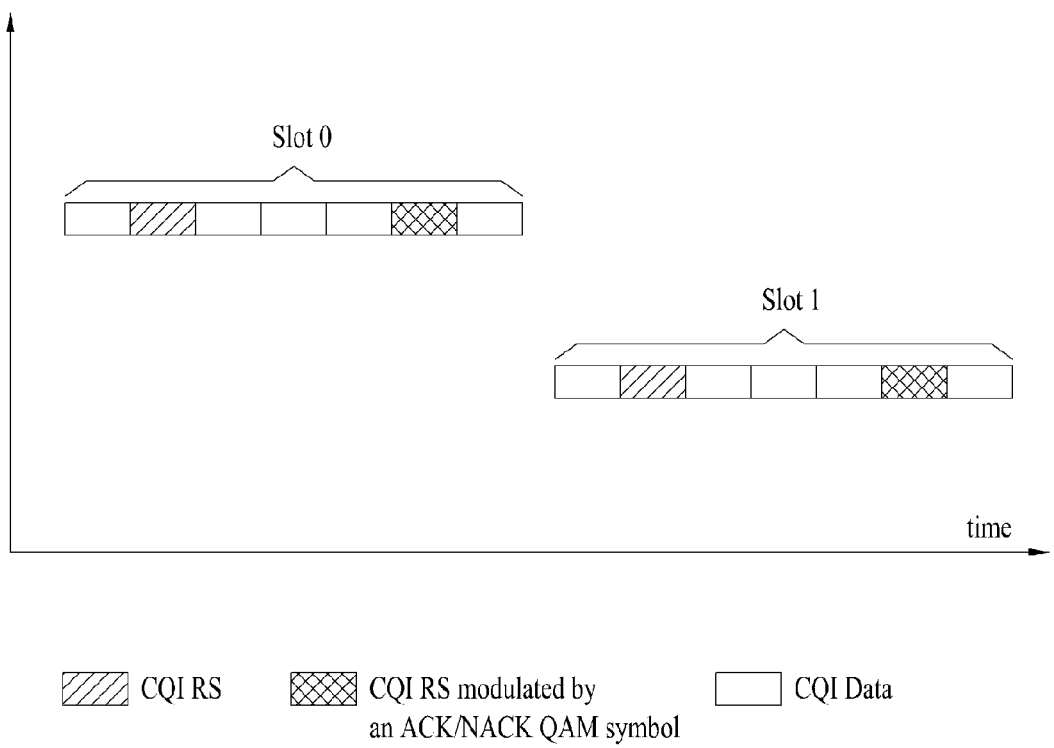
FIG. 12 illustrates an example of simultaneously transmitting CQI information and ACK/NACK information.

An example of simultaneously transmitting CQI information and ACK/NACK information will now be described in detail with reference to FIG. 12.

In case of a normal CP, CQI information and ACK/NACK information may be simultaneously transmitted by using the PUCCH formats 2a/2b. The ACK/NACK information may be transmitted by using a symbol through which the described CQI RS, shown in FIG. 12, is transmitted. More specifically, in case of the normal CP, a second RS is modulated to an ACK/NACK symbol. When the ACK/NACK symbol is modulated by using the BPSK scheme, as in the PUCCH format 1a, the CQI RS is modulated to an ACK/NACK symbol by using the BPSK scheme. And, when the ACK/NACK symbol is modulated by using the QPSK scheme, as in the PUCCH format 1b, the CQI RS is modulated to an ACK/NACK symbol by using the QPSK scheme. Meanwhile, in case of an extended CP, the CQI information and the ACK/NACK information may be simultaneously transmitted by using the PUCCH format 2. In order to do so, the CQI information and the ACK/NACK information are processed with joint coding.

In addition to the description given above, reference may be made on a standard document (e.g., 3GPP TS36.211 verse 5.4) for the description on the PUCCH. And, therefore, for clarity and simplicity of the description, the detailed contents given in the above-mentioned document will be omitted. However, it will be apparent that the detailed contents disclosed in the standard document on the PUCCH may be applied to the PUCCH used in the various exemplary embodiments according to the present invention.

When the above-described carrier aggregation is applied, generally, as a means for configuring a carrier that is used for transmitting downlink and uplink data transmission physical channels (PDSCH (physical downlink shared channel) and PUSCH (physical uplink shared channel)) and downlink and uplink control information transmission channels (PDCCH (physical downlink control channel) and PUCCH (physical uplink control channel)), downlink/uplink component carrier (DL/UL CC) linkage may be configured for UE-specific (or RN-specific) carrier assignment (or allocation).

However, in various carrier aggregation situations, unlike the configurations made with respect to the DL/UL CC linkage, it may be required to configure a UL CC for transmitting uplink control information through the PUCCH or the PUSCH. Herein, the various exemplary embodiments of the present invention correspond to methods for configuring DL/UL CC linkage and methods for configuring UL CCs enabling a base station (cell) or relay station to transmit uplink control information respective to uplink transmission entities within its region (or domain) through the PUCCH or PUSCH. Also, the various exemplary embodiments of the present invention correspond to methods for multiplexing and transmitting heterogeneous uplink control information through a single PUCCH channel with respect to the methods for configuring uplink control information transmission UL CC.

Figure 13:
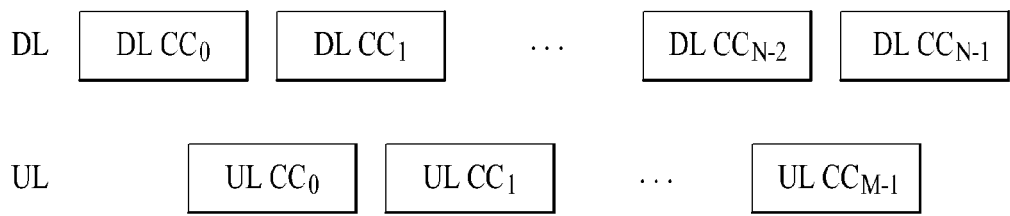
FIG. 13 illustrates conceptual views showing downlink and uplink component carriers (CC).

FIG. 13 illustrates conceptual views showing downlink and uplink component carriers (CC). Downlink (DL) and uplink (UL) CCs of FIG. 13 may be assigned (or allocated) from the base station (cell) or relay station. And, for example, the number of DL CCs may be set to N, and the number of UL CCs may be set to M.

After performing a process step of configuring an RRC connection (cell search process, system information acquisition/reception process, initial random access process, and so on) based upon a single random CC for each of the DL and UL through an initial access or initial deployment process of the user equipment, unique carrier configuration specific to each user equipment may be received from the base station via dedicated signaling (UE-specific RRC signaling or UE-specific L1/L2 PDCCH signaling). Alternatively, when carrier configuration for each user equipment is commonly realized in base station (cell or cell cluster) units, the carrier configuration may also be provided via cell-specific RRC signaling or cell-specific UE-common L1/L2 PDCCH signaling. Alternatively, carrier configuration information configured in the base station may also be signaled to the user equipment via system information for the RRC connection configuration (or set up). Or, the carrier configuration information may also be signaled to the user equipment via separate system information or cell-specific RRC signaling after the RRC connection configuration process step.

Hereinafter, DL/UL CC configuration will be described in detail based upon the relation between the base station and the user equipment. However, the present invention will not be limited only to the example given herein. For example, for a user equipment located within a relay station region, the description given herein may be identically applied to the case when the relay station provides the DL/UL CC configurations of the corresponding user equipment. Also, for a relay station located in a base station region, the description given herein may also be identically applied to the case when the base station provides the DL/UL CC configurations of the corresponding relay station. Hereinafter, the DL/UL CC configurations are described based upon the relation between the base station and the user equipment, for simplicity. Nevertheless, it will be apparent that the same description may be identically applied to a relay station-user equipment relation (access uplink and downlink) and to a base station-relay station relation (backhaul uplink downlink).

During the above-described process of uniquely assigning DL/UL CCs to individual user equipment, the DL/UL CC linkage may either be implicitly configured, or be explicitly configured by using the definition of a random signaling parameter.

Figure 14:
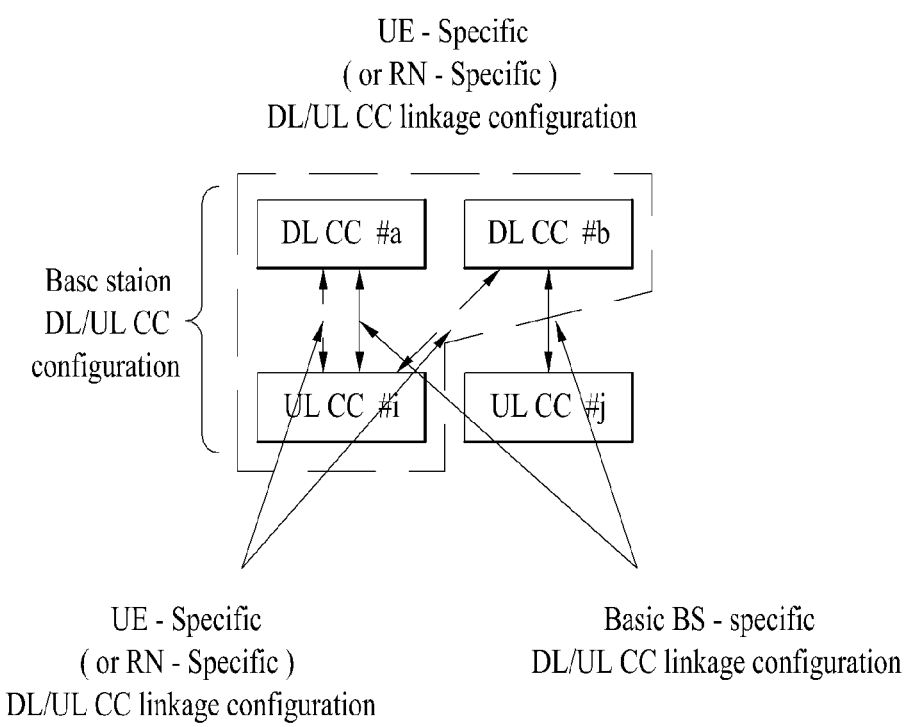
FIG. 14 illustrates an example of a DL/UL CC linkage.

FIG. 14 illustrates an example of a DL/UL CC linkage. When the base station configures a CC with 2 downlink CCs (DL CC #a and DL CC #b) and 2 uplink CCs (UL CC #i and UL CC #j), FIG. 14 shown an exemplary DL/UL CC linkage, which is defined in accordance with the assignment of 2 downlink CCs (DL CC #a and DL CC #b) and 1 uplink CC (UL CC #i) to a random user equipment. In the DL/UL CC linkage shown in FIG. 14, the solid lines indicate the linkage configuration between the DL CCs and the UL CCs configuring the base station, and this may be defined in SIB 2. In the DL/UL CC linkage shown in FIG. 14, the dotted lines indicate a linkage configuration between DL CCs and UL CCs that are configured for a specific user equipment.

Hereinafter, an example of DL/UL CCs being configured as shown in FIG. 14 will be described in detail. However, the present invention will not be limited only to the example given herein. More specifically, in the diverse exemplary embodiments of the present invention, it will be apparent that the number of DL CCs and UL CCs configured by the base station may be assigned with a random value. And, accordingly, it will also be apparent that the number of DL CCs and UL CCs being UE-specifically configured or assigned (or allocated) within the DL CCs and UL CCs, which are configured as described above, may be assigned with a random value. And, it will also be apparent that the respective DL/UL CC linkage may also be defined by using a method other than the method shown in FIG. 14.

Hereinafter, as described above, in a situation where the base station configures the DL CCs and the UL CCS, UE-specifically assigns DL/UL CCs, and configures the respective DL/UL CC linkage, an exemplary embodiment of a method for configuring a UL CC for transmitting uplink control information through the PUCCH or PUSCH of a random user equipment will be described in detail.

The control information being transmitted by the user equipment via uplink may include ACK/NACK on DL PDSCH and/or PDCCH transmission, channel status information (CSI) being measured for DL PDSCH and/or PDCCH transmission, and a scheduling request (SR) requesting UL transmission resource allocation. The CSI may include CQI/PMI/RI, and, alternatively, the CSI may also include a direct channel quantization vector, a channel eigenvector, a channel covariance matrix, and so on. In the following description, such elements will be collectively referred to as CSI.

A PUCCH dedicated format may be used for transmitting the above-described uplink control information. The channel resource of such PUCCH format may be implicitly configured by using L1/L2 UL grant PDCCH, DL channel assignment PDCCH, or DL RB (resource block) assignment index, and so on. Or, the channel resource of such PUCCH format may be explicitly configured via RRC-configured UE-specific RRC control signaling. Alternatively, in order to transmit uplink control information, depending upon the method for multiplexing control information that is specified over the PUSCH, the uplink control information may be transmitted by being mapped to a PUSCH physical resource.

The various exemplary embodiments on the UL CC configuration for the uplink control information transmission, which will hereinafter be described in detail, may be used for partial or whole (or full) transmission of the uplink control information, as described above. And, the exemplary embodiments may also be applied to diverse physical channels transmitting the uplink control information and also applied to the combination of such diverse physical channels.

Configuration of UL CC for Transmitting Uplink Control Information Through DL/UL CC Linkage Hereinafter, a method for configuring a UL CC, through which uplink control information is to be transmitted, via UE-specific DL/UL CC linkage, which is configured with respect to a UE-specific DL/UL CC assignment. This method will be referred to as Method 1 for being differentiated from other methods of UL CC configuration, which will be described later on in the description of the present invention.

Essentially, a UL CC allowing an uplink transmission entity (user equipment or relay station) to transmit uplink control information through the PUCCH or PUSCH, may be configured by using DL/UL CC linkage, which is defined by a DL/UL CC assignment specifically configured for the corresponding uplink transmission entity.

Embodiment 1-1

Embodiment 1-1 according to the present invention corresponds to a method for configuring a UL CC for transmitting uplink ACK/NACK control information.

An ACK/NACK for downlink PDSCH and/or PDCCH transmission is transmitted. Herein, when configuring an ACK/NACK transmission resource, two of the following cases may be considered. A first case corresponds to a dynamic ACK/NACK, which is configured to implicitly assigning (or allocating) ACK/NACK resources. A second case corresponds to a case of assigning uplink ACK/NACK transmission resource by using a UE-specific RRC signaling, which is configured by an upper layer (or higher-level layer) (RRC). The configuration of an uplink ACK/NACK transmission resource via UE-specific RRC signaling may be used in a case when a PDSCH is to be transmitted without any separate downlink channel assignment PDCCH based upon a semi-persistent scheduling, or in a case when a fixed ACK/NACK transmission resource is to be clearly assigned based upon a specific object, when configuring an ACK/NACK transmission resource.

Embodiment 1-1 according to the present invention may be applied to the above-described PUCCH format 1a/1b and may also be applied to an evolved PUCCH format configuration of the PUCCH format 1a/1b. Alternatively, embodiment 1-1 may also be applied to a case when an uplink ACK/NACK is transmitted through the PUSCH.

When configuring the UL CC, which is to be used for the ACK/NACK transmission resource configuration corresponding to three of the above-described cases, essentially, the UL CC may be decided in accordance with the settings made by the DL/UL CC linkage. More specifically, when performing PUCCH ACK/NACK transmission, which is configured as a higher-level layer, without the provision of a DL channel assignment PDCCH, the ACK/NACK may be transmitted by using a UL CC configuring a linkage with a DL CC, through which a DL PDSCH is transmitted, through the PUCCH or the PUSCH. Alternatively, when configuring the higher-level layer, the UL CC that is to be used for the ACK/NACK transmission may be explicitly and directly configured via specific RRC signaling with respect to an uplink transmission entity. Most particularly, at this point, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

Meanwhile, in case of a PDSCH transmission with the provision of a DL channel assignment PDCCH, a method for configuring a UL CC, through which the respective ACK/NACK is to be transmitted through the PUCCH or the PUSCH, will now be described in detail (when transmitting an ACK/NACK through the PUCCH, a dynamic ACK/NACK resource configuration may be applied). In case the DL channel assignment PDCCH and the PDSCH being the target of the PDCCH are transmitted to the uplink transmission entity through the same DL CC, it may be decided that the UL CC, which establishes a linkage with the corresponding DL CC, can be used for the uplink ACK/NACK transmission. Alternatively, as another method, the UL CC that is to be used for the ACK/NACK transmission may be explicitly and directly configured via specific RRC signaling or UL grant PDCCH with respect to an uplink transmission entity. Most particularly, at this point, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

Meanwhile, when a DL channel assignment PDCCH and a PDSCH being the target of the PDCCH are transmitted to an uplink transmission entity through different DL CCs (more specifically, when a predetermined cross-carrier scheduling is applied), a detailed method for configuring a UL CC enabling the corresponding uplink transmission entity to transmit an ACK/NACK through the PUCCH or the PUSCH is required to be defined. In order to do so, the following two methods may be considered.

According to a first method, the corresponding uplink transmission entity may transmit the uplink ACK/NACK through the PUCCH or the PUSCH by using the UL CC, which establishes a linkage with the DL CC through which the DL channel assignment PDCCH is transmitted. In other words, generally, when a linkage is established between a random DL CC and a random UL CC, provided that a DL channel assignment PDCCH of the corresponding DL CC and a UL grant PDCCH of the corresponding UL CC are transmitted through the same DL CC, and, in case the uplink ACK/NACK is transmitted through the PUSCH, it may be expressed that the uplink transmission entity transmits an uplink ACK/NACK through the PUSCH by using the UL CC, which configures a linkage with the DL CC through which the UL grant PDCCH for the corresponding PUSCH is transmitted.

According to a second method, the corresponding uplink transmission entity may transmit uplink ACK/NACK through the PUCCH or the PUSCH by using the UL CC which configures a linkage with the DL CC, through which the PDSCH is being transmitted.

The following details may be taken into consideration when applying a dynamic ACK/NACK. When using a UL CC configuring a linkage with a DL CC, through which the PDCCH is transmitted, ACK/NACK resource within the UL CC may be configured by using a lowest CCE index of the PDCCH, such as the conventional 3GPP LTE system (e.g., release 8). And, when using a UL CC configuring a linkage with a DL CC, through which the PDSCH is transmitted, ACK/NACK resource over the UL CC may be configured by using a lowest CCE index of the PDCCH, such as the conventional 3GPP LTE system (e.g., release 8), or the ACK/NACK resource over the UL CC may be configured by using a lowest physical resource block (PRB) index of the PDSCH.

Embodiment 1-2

Embodiment 1-2 according to the present invention corresponds to a method for configuring a UL CC for transmitting uplink CSI.

Essentially, in order to transmit the CSI via uplink, PUCCH formats 2/2a/2b may be used. Alternatively, CSI may also be transmitted by using an evolved form of the PUCCH format based upon the PUCCH formats 2/2a/2b. In this case, a PUCCH channel resource may be configured by a higher layer (RRC) configuration specifically for the uplink transmission entity via RRC signaling. Meanwhile, in case of feeding back the CSI through the PUSCH, a resource designated for CSI transmission may be assigned by using the UL grant PDCCH. In this case, most particularly, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

When feeding back the CSI through the PUSCH, when a PUSCH being scheduled over a random uplink transmission subframe and CSI that is to be periodically fed back through the PUCCH exist, this corresponds to when the corresponding CSI is transmitted through the PUCCH (i.e., a method of piggybacking Uplink Control Information (UCI) over the PUSCH), or this corresponds to when an indicator indicating the CSI to be aperiodically fed back through the PUSCH is delivered to the user equipment through UL grant PDCCH.

The UL CC, which is used for the CSI transmission of the uplink transmission entity, may essentially be configured of a UL CC configuring a linkage with the DL CC, which is the CSI measurement target. Alternatively, in case of a CSI feedback through the PUSCH, the UL grant PDCCH of a specific DCI format for configuring the corresponding PUSCH resource and for defining the transmission mode is transmitted. Herein, by using the UL CC, which configures a linkage with the DL CC through which the PDCCH is transmitted, the CSI may be transmitted. For example, if a DL CC is configured with respect to a random uplink transmission entity, i.e., a user equipment or a relay node, this indicates that the UL grant PDCCH for the PUSCH of the CSI respective to the corresponding DL CC is transmitted from the same DL CC, and this also indicates that the CSI of the corresponding DL CC is transmitted by using a PUSCH transmission over the UL CC, which establishes a linkage between the UL CC and the corresponding DL CC. In another example, if multiple DL CCs are configured with respect to a random uplink transmission entity, i.e., a user equipment or a relay node, this indicates that the UL grant PDCCH is individually transmitted in order to transmit the CSI respective to each individual DL CC is transmitted from the same DL CC, and that the PUSCH, which is respective to the CSI of the DL CC being designated by the transmitted UL grant PDCCH, may be transmitted through the UL CC, which configures a linkage with the DL CC through which the corresponding UL grant PDCCH is transmitted. At this point, a specific DL CC, to which the corresponding UL grant PDCCH designates an aperiodic CSI feedback, may be indicated by using a CIF within the DCI of the corresponding UL grant. Or, conversely, the specific DL CC may be designated by using RRC signaling on the corresponding uplink transmission entity. Such method is defined as a cell-specific or UE-specific primary carrier, and such method may be conveniently applied in an environment, which is defined to have the UE-specific PUCCH transmitted through the corresponding primary carrier. Meanwhile, in case a UL carrier wave (UL primary CC) or a UL primary CC is separately configured, the corresponding UL Primary CC may transmit ACK/NACK information by using the corresponding UL primary carriers. The definition of the UL primary carriers will be described later on with reference to 1-4.

Embodiment 1-3

Embodiment 1-3 according to the present invention corresponds to a method for configuring a UL CC for transmitting uplink Scheduling Request (SR).

The uplink SR may essentially be transmitted through PUCCH format 1. Also, the uplink SR may be configured as a higher layer (RRC) within a random UL CC, and the transmission channel resource may be configured (or set up) via UE-specific RRC signaling. At this point, most particularly, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

When configuring the UL CC that transmits the SR PUCCH, a method of transmitting the SR PUCCH by using a UL CC, provided that a PUSCH will be transmitted, may be applied. Alternatively, when a cell-specific or UE-specific primary carrier is defined, the SR PUCCH may be transmitted by using a UL CC, which configures a linkage with the corresponding primary carrier. Also, when a UL primary carrier is separately configured, the SR PUCCH may also be transmitted by using the corresponding UL primary carrier.

Embodiment 1-4

When a UL CC for transmitting each type of uplink control information (UL ACK/NACK, CSI, SR) according to embodiments 1-1 to 1-3, and, among the uplink control information, embodiment 1-4 corresponds to a method that is configured to transmit 2 or more different types of the uplink control information by using the same UL CC. A single common UL CC through which such uplink control information is transmitted may be expressed as a UL primary CC or a UL anchor CC.

In other words, the UL primary carrier may be defined by a single UL CC per uplink transmission entity (user equipment or relay station), and the UL primary carrier may also be defined as a single UL CC through which the uplink control information is being transmitted (ACK/NACK, CSI, and SR). More specifically, the UL primary carrier may be defined as a single UL CC through which the PUCCH is transmitted. In all cases, such as when the DL CC and the UL CC are symmetrical, when the DL CC and the UL CC are asymmetrical, when cross-scheduling is supported, when cross-scheduling is not supported, and so on, the UL primary carrier may be configured as a single UL CC per uplink transmission entity. The definition of such UL primary carrier will not be limited only to the embodiments of the present invention but will be applied to the overall aspects of the present invention.

UL CC Configuration for Transmitting Uplink Control Information Using Explicit Signaling Hereinafter, a method for configuring a UL CC for allowing an uplink transmission entity (e.g., user equipment) to transmit uplink control signal by using explicit signaling received from an uplink reception entity (e.g., base station) will now be described in detail. This method of the present invention will be referred to as Method 2 in order to be easily differentiated from the above described UL CC Configuration method (Method 1).

In Method 2 according to the present invention, when configuring a UL CC allowing the uplink transmission entity to transmit uplink control information (at least one or more types of the uplink control information) through a PUCCH or a PUSCH, Method 2 may explicitly signal the specific UL CC through which the uplink control information is being transmitted by using cell-specific or UE-specific RRC signaling or L1/L2 control signaling (e.g., PUCCH of a specific DCI format). At this point, the range of the UL CC that are explicitly signaled may include UL CCs that configure the base station or UL CCs that are uniquely configured (or set up) to the uplink transmission entity. And, most particularly, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

Embodiment 2-1

Embodiment 2-1 according to the present invention corresponds to a method for configuring a UL CC for transmitting uplink ACK/NACK.

An ACK/NACK for downlink PDSCH and/or PDCCH transmission is transmitted. Herein, when configuring an ACK/NACK transmission resource, two of the following cases may be considered. A first case corresponds to a dynamic ACK/NACK, which is configured to implicitly assigning (or allocating) ACK/NACK resources. A second case corresponds to a case of assigning uplink ACK/NACK transmission resource by using a UE-specific RRC signaling, which is configured by an upper layer (or higher-level layer) (RRC). The assignment of an uplink ACK/NACK transmission resource by using UE-specific RRC signaling, which is configured by a higher layer (RRC), may be used in a case when a PDSCH is to be transmitted without any separate downlink channel assignment PDDCH based upon a semi-persistent scheduling, or in a case when a fixed ACK/NACK transmission resource is to be clearly assigned based upon a specific object, when configuring an ACK/NACK transmission resource.

Embodiment 2-1 according to the present invention may be applied to the above-described PUCCH format 1a/1b and may also be applied to an evolved (or newly adopted) PUCCH format configuration of the PUCCH format 1a/1b. Alternatively, embodiment 2-1 may also be applied to a case when an uplink ACK/NACK is transmitted through the PUSCH.

When configuring the UL CC, which is to be used for the ACK/NACK transmission resource configuration corresponding to three of the above-described cases, essentially, the UL CC that is used for ACK/NACK transmission may be explicitly signaled by using cell-specific or UE-specific RRC signaling or L1/L2 control signaling (e.g., UL grant of a specific DCI format, DL grant of a specific DCI format, or a randomly dedicated PDCCH). More specifically, among the UL CCs that configure the base station, the signaling process may be performed to transmit ACK/NACK through the PUCCH or PUSCH by randomly using at least one or more UL CCs. Most particularly, at this point, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

Within the UL CC that is configured by using the above-described explicit signaling process, ACK/NACK resource within the UL CC may be configured by using a lowest CCE index of the PDCCH, such as the conventional 3GPP LTE system (e.g., release 8). Alternatively, when the DL transmission is performed by using multiple PDSCHs, a collision may occur in configuring the ACK/NACK resource corresponding to the multiple PDSCHs, when the configuration is based only upon the lowest CCE index of the PDCCH. In this case, the ACK/NACK resource may be configured by applying a different standard. For example, the ACK/NACK resource within the UL CC may be configured by using a lowest physical resource block (PRB) index of the PDSCH.

In a situation where the cell-specific or UE-specific UL primary carrier is configured, the explicit signaling process for configuring UL CCs designated for ACK/NACK transmission may be replaced with a separate explicit signaling process for configuring the UL primary carrier. Alternatively, when the UL primary carrier is implicitly (e.g., by essentially using the UL CC configuring a linkage with the DL CC within the base station) configured by using a DL primary carrier configuration, the explicit signaling process for configuring UL CCs designated for ACK/NACK transmission may be replaced with a separate explicit signaling process for configuring the DL primary carrier, and the UL primary carrier may be indirectly configured.

Embodiment 2-2

Embodiment 2-2 according to the present invention corresponds to a method for configuring a UL CC for transmitting uplink CSI.

Essentially, in order to transmit the CSI via uplink, PUCCH formats 2/2a/2b may be used. Alternatively, CSI may also be transmitted by using an evolved form of the PUCCH format based upon the PUCCH formats 2/2a/2b. In this case, a PUCCH channel resource may be configured by a higher layer (RRC) configuration specifically for the uplink transmission entity via RRC signaling. Meanwhile, in case of feeding back the CSI through the PUSCH, a resource designated for CSI transmission may be assigned by using the UL grant PDCCH.

Essentially, the UL CC that is used for the CSI transmission of the uplink transmission entity may be explicitly signaled by using cell-specific or UE-specific RRC signaling or L1/L2 control signaling (e.g., UL grant of a specific DCI format, DL grant of a specific DCI format, or a randomly dedicated PDCCH). Alternatively, when the UL primary carrier is separately configured, the explicit signaling process for configuring UL CCs designated for ACK/NACK transmission may be replaced with a separate explicit signaling process for configuring the UL primary carrier. Most particularly, when cross-carrier scheduling is applied, a carrier indicator, which is designated for another purpose, may also be used as an indicator for configuring the UL CC. The carrier indicator, which is designated for another purpose may, for example, correspond to a CC (Component Carrier) index indicating a target carrier when performing carrier aggregation or to a CIF (Carrier Indication Field).

Embodiment 2-3

Embodiment 2-3 according to the present invention corresponds to a method for configuring a UL CC for transmitting uplink Scheduling Request (SR).

The uplink SR may essentially be transmitted through PUCCH format 1. Also, the uplink SR may be configured as a higher layer (RRC) within a random UL CC, and the transmission channel resource may be configured (or set up) via UE-specific RRC signaling.

When configuring the UL CC that transmits the SR PUCCH, essentially, the UL CC that is used for the SR transmission may be explicitly signaled by using cell-specific or UE-specific RRC signaling or L1/L2 control signaling (e.g., PDCCH of a specific DCI format).

Alternatively, when a cell-specific or UE-specific primary carrier is defined, the SR PUCCH may be transmitted by using a UL CC, which configures a linkage with the corresponding primary carrier. Also, when a UL primary carrier is separately configured, the SR PUCCH may also be transmitted by using the corresponding UL primary carrier. In this case, the explicit signaling process configuring the UL CCs designated for the SR transmission may be replaced with explicit/implicit signaling processes that designate the DL primary carrier or the UL primary carrier.

Embodiment 2-4

When UL CC, which is designated for transmitting uplink control information (UL ACK/NACK, CSI, SR) according to the above-described embodiments 2-1 to 2-3, is configured by using explicit signaling (cell-specific or UE-specific RRC signaling or L1/L2 control signaling (e.g., PDCCH of a specific DCI format))), embodiment 2-4 corresponds to a configuration method allowing at least 2 or more types of uplink control information to be transmitted through a base station or relay station configuration, the base station or the relay station being the subject of the explicit signaling process, by using the same single UL CC. Such a single common UL CC may be expressed as a UL primary carrier (or UL primary component carrier) or a UL anchor carrier (or a UL anchor primary component carrier).

Although the diverse exemplary embodiments proposed in the above-described Method 1 and Method 2 will be described separately with respect to the type of the control information being transmitted from the uplink transmission entity, embodiments of the present invention may be identically applied to the method for configuring the UL CC, through which the overall uplink control information is transmitted.

Multiplexing of the Uplink Control Information

Hereinafter, a method for multiplexing the uplink control information and transmitting the multiplexed uplink control information will be described in detail.

In a communication system adopting the carrier aggregation (CA) technology, the user equipment may multiplex various types of uplink control information through a PUCCH format or PUSCH within the configured UL CC (e.g., UL CC or UL primary carrier configured by the above-described Method 1 or 2) and transmit the multiplexed information.

For example, when one or more DL CCs within a downlink are aggregated and transmitted, multiple downlink transport blocks may be transmitted (this may also be referred to as multiple PDSCH transmission based upon a single codeword transmission), and multiple uplink ACK/NACK information are required to be transmitted in correspondence with the multiple transport blocks. More specifically, one ACK/NACK information corresponding to one DL transmission block may be transmitted. Also, when a downlink scheduler requests for channel measurement information on multiple DL CCs within a DL active CC set (a set of RRC configured CCs), multiple CSI information are requested to be transmitted.

When the above-described multiple uplink control information (e.g., multiple ACK/NACK information, multiple CSI information) are transmitted within the configured UL CC through the PUCCH or PUSCH, a detailed method for multiplexing multiple uplink control information and for transmitting the multiplexed information is required to be performed.

The different types of uplink control information may be categorized to 3 different types (ACK/NACK, CSI, and SR). Therefore, a case when another type of uplink control information is multiplexed and transmitted may be divided into 3 cases.

Case 1: Multiplexed transmission of uplink ACK/NACK information and CSI information Case 2: Multiplexed transmission of uplink ACK/NACK information and SR information Case 3: Multiplexed transmission of uplink CSI information and SR information When the above-described uplink control information are multiplexed and transmitted within the configured UL CC (e.g., UL CC being configured by Method 1 or Method 2) through the PUCCH or PUSCH, the multiplexing methods will hereinafter be described in detail.

In relation to the multiplexing method of heterogeneous uplink control information, the PUCCH formats 1/1a/1b and PUCCH formats 2/2a/2b, which are defined in the conventional 3GPP LTE system (e.g., reference to release-8, standard document 3GPP TS36.211 release 8) may be recapitulated in a table format as shown below in Table 6.

TABLE 6

| PUCCH Format Type | Application |
| --- | --- |
| PUCCH format 1 | Scheduling request transmission |
| PUCCH format 1a | 1 bit ACK/NACK transmission |
| PUCCH format 1b | 2 bit ACKNACK transmission |
| PUCCH format 2 | CQI/PMI/RI (or CSI in LTE-advanced) transmission |
| PUCCH format 2a | CQI/PMI/RI (or CSI in LTE-advanced) + 1 bit ACK/NACK transmission in normal CP case |
| PUCCH format 2b | CQI/PMI/RI (or CSI in LTE-advanced) + 2 bit ACK/NACK transmission in normal CP case |

In case of the normal CP, as shown in Table 6 below, when CSI and 1-bit or 2-bit ACK/NACK are multiplexed and transmitted, PUCCH formats 2a/2b may be used. Additionally, when the SR and ACK/NACK are multiplexed and transmitted, a method for transmitting PUCCH format 1a or 1b as an SR PUCCH channel resource, which is reserved for the SR transmission, by using a RRC signaling process, may be applied (see FIG. 10). In case of the extended CP, when CSI and 1-bit or 2-bit ACK/NACK are multiplexed and transmitted, as described in the conventional 3GPP LTE standard document (e.g., 3GPP LTE TS36.212 and TS36.213 of the release 8 version), a method of joint coding the ACK/NACK information and the CSI information and transmitting the joint coded information via PUCCH format 2 may be applied. When the SR and CSI are multiplexed and transmitted, a method of dropping the CSI information without performing transmission and transmitting only the SR may be applied.

In the LTE-advanced system, an additional PUCCH format may be newly defined depending upon the specific control information. The definition of a new PUCCH format may be related to a change in the modulation and multiplexing in accordance with an increase in the amount of information of the uplink transmission control information, and the definition of the new PUCCH format may also be related to a mapping method or transmission method different from the transmission method of the conventional format with respect to a physical transmission resource mapping after the configuration of the physical channel. For example, a new PUCCH format may be defined in accordance with a channel selection method expressing information through a reservation of multiple PUCCH transmission resources and resource selection, a new PUCCH format design including a modulation method for extending the payload size or precoding, a method for differently multiplexing control information with respect to symbol units or in a configuration code sequence perspective within the PUCCH, a method for multiplexing different control information for each slot within a PUCCH formats 1a/1b, a method for transmitting ACK/NACK control information by using a PUCCH format 2 series, or multi code modulation.

With respect to the above-described PUCCH channel types, when an uplink subframe having heterogeneous uplink control information multiplexed and transmitted within a configured UL CC (e.g., UL CC or UL primary carrier configured by Method 1 or Method 2), multiple PUCCH resource configurations may be realized within respect to all or a portion of the uplink control information types (multi PUCCH configuration). For example, when multiple PDSCHs are transmitted through multiple DL CCs (transmission of multiple DL transport blocks), and when multiple uplink ACK/NACKs corresponding to the multiple PDSCHs are being transmitted through the UL CC, a number of PUCCHs identical to the number of PDSCHs or smaller than the number of PDSCHs (e.g., half the number of PDSCHs) may be configured. In another example, in order to perform feedback of the CSI information as an L2 measurement for performing scheduling on multiple DL CCs, the number of PUCCH channels may be set up to be equal to or less than the number of DL CCs that are to be measured (i.e., measurement targets). Hereinafter, methods for transmitting heterogeneous uplink control information from the same uplink subframe, in a multiple PUCCH channel configuration situation for such specific control information, will be described in detail.

Embodiment A

Embodiment A of the present invention corresponds to a method for configuring PUCCH transmission channel for individual control information without multiplexing each specific control information through a single PUCCH.

In this embodiment, it is assumed that, among the uplink control information types listed above (ACK/NACK, CSI, or SR), N (N≥1) number of PUCCH channels are configured in order to transmit a random uplink control information A from a random specific uplink subframe, and M (M≥1) number of PUCCH channels are configured in order to transmit a different type of uplink control information B from the same subframe. More specifically, multiple PUCCHs may be concurrently (or simultaneously) transmitted by performing PUCCH decoupling. The fact that multiple PUCCH channels are configured for the transmission of heterogeneous uplink control information signifies that the current situation can no longer maintain the single-carrier property for essentially maintaining a low PAPR (Peak-to-Average Power Ratio) or CM (Cubic Metric) in an uplink transmission. Therefore, a method of performing transmission through N+M (N+M≥2) number of PUCCHs without performing any multiplexing (including dropping or joint coding) between heterogeneous control information within a random PUCCH channel may be applied herein.

Alternatively, in a situation where N number of PUCCH channels and M number of PUCCH channels are required in order to transmit uplink control information A and B, an information compression method (e.g., information bundling or a predetermined PUCCH channel selection method) or a new PUCCH format providing an extended payload size may be applied to each of the uplink control information A and B, so that the uplink control information A and B can be transmitted through N' (N'<N) number of PUCCHs and M' (M'<M) number of PUCCHs, i.e., through a total of N'+M' number of PUCCHs.

As a detailed example related to the above-described situation, in a situation where P (P≥1) number of PUCCH format 1a or PUCCH format 1b are configured in order to transmit multiple ACK/NACK information, and where Q (Q≥1) number of PUCCH format 2 are configured in order to perform CSI transmission, configurations may be made so that P number of PUCCH formats 1a/1b and Q number of PUCCH format 2 can be transmitted from the same uplink subframe, without performing multiplexing within the PUCCH format 2 between the ACK/NACK and the CSI. Additionally, by performing ACK/NACK bundling or ACK/NACK channel selection (respective to multiple PUCCH transmission resources within the configured UL CC), the ACK/NACK may be transmitted through P' (P'<P) number of PUCCH format 1a or PUCCH format 1b, and by applying a new PUCCH format having a payload size more extended than PUCCH format 2 (by using methods, such as multi code modulation or multi antennae transmission), or by performing a predetermined TDM based information division multiplexing process, CSI transmission may be performed through Q' (1≤Q'<Q) number of PUCCHs. Accordingly, ACK/NACK and CSI may be multiplexed and transmitted by using P'+Q' number of PUCCHs.

Embodiment B

Embodiment B of the present invention corresponds to a method for multiplexing multiple heterogeneous uplink control information through a random PUCCH channel and a method for configuring a mapping (or pair) relation between the heterogeneous uplink control information, the heterogeneous uplink control information being multiplexed based upon a predefined rule (including implicit relation configuration) or a signaling process. Accordingly, with reference to a part describing the PUCCH in the description of the present invention, the heterogeneous uplink control information may be multiplexed by applying a method identical to the method defined in the conventional 3GPp LTE system (e.g., reference to 3GPP LTE release-8, standard document 3GPP TS36.211 release-8).

With respect to the above-described embodiment A of the present invention, it may be required to limit the number of PUCCHs being concurrently (or simultaneously) transmitted (multiplexed and transmitted) from a single uplink subframe to a minimum of 1 PUCCH. Accordingly, a method for multiplexing heterogeneous uplink control information, which is defined in the conventional 3GPP LTE system (e.g., reference to 3GPP LTE release-8, standard document 3GPP TS36.211 release-8) may be entirely (or fully) or partially applied to the uplink control information A and the uplink control information B. Herein, in the method for multiplexing heterogeneous uplink control information defined in the conventional 3GPP LTE system, since the size of the uplink control information that can be multiplexed is designed to fit the single carrier situation, it may be difficult to perform full multiplexing on all of the multiple uplink control information respective to the multiple DL CCs, which is proposed in the present invention, within a single PUCCH. Based upon such difficulty, detailed embodiments of the present invention for multiplexing heterogeneous control information in a system supporting carrier aggregation will hereinafter be described in detail.

Embodiment B-1

Embodiment B-1 of the present invention corresponds to an exemplary multiplexed transmission of the ACK/NACK and the CSI. When performing uplink transmission on the ACK/NACK and the CSI, the ACK/NACK and the CSI may be multiplexed and transmitted by using a PUCCH format 2 series. At this point, as defined in the conventional LTE system (e.g., release 8), a method of modulating 1-bit or 2-bit ACK/NACK information within an RS symbol of PUCCH format 2, by using BPSK (or binary Walsh covering) or QPSK (or DFT $\{1, -1, j, -j\}$ based Walsh covering), may be applied. If the size of the ACK/NACK information that is being multiplexed is larger than 2 bits, a method of increasing the modulation order within the RS symbol may be applied. For example, modulation may be performed by using 8PSK or 16PSK. On the other hand, by bundling the ACK/NACK information, which is being multiplexed, to a maximum size of 2 bits in a Component Carrier (CC) region, a spatial (or spatial codeword) region, or a time (subframe level) region, the ACK/NACK information may be compressed to a maximum size of 2 bits, so as to be transmitted by using the conventional method. The detailed description of the same will be given later on in the description for Embodiment B-2. In this case, the ACK/NACK and CSI that are being multiplexed may be defined as the ACK/NACK and CSI respective to a DL transport block within the same DL CC.

For example, when the ACK/NACK and the CSI are transmitted with respect to the transmission over DL CC#1 and DL CC #2, ACK/NACK 1 and CSI 1 corresponding to the DL CC#1 transmission may be multiplexed and transmitted by using PUCCH format 2a/2b. And, ACK/NACK 2 and CSI 2 corresponding to the DL CC#2 transmission may be multiplexed and transmitted by using PUCCH format 2a/2b.

Embodiment B-2

Embodiment B-2 of the present invention corresponds to another exemplary multiplexed transmission of the ACK/NACK and the CSI. When performing uplink transmission on the ACK/NACK and the CSI, the ACK/NACK and the CSI may be multiplexed and transmitted by using a PUCCH format 2 series. At this point, a case when the ACK/NACK information respective to DL transport blocks within multiple DL CCs are mixed by using an information-level compression method is being considered (e.g., a bundling or channel selection method may be applied to the information-level compression method). A logical index may be set up (or configured) by using a predetermined condition or rule with respect to the ACK/NACK and CSI that are to be multiplexed and transmitted within a random UL CC being configured for the user equipment (Herein, the predetermined condition or rule may include an implicit relation configuration, or carrier index order or equation). A random virtual pair may be configured between the ACK/NACK and the CSI in accordance with a configured index order, and a heterogeneous uplink multiplexing method, which is defined in the conventional 3GPP LTE system (e.g., release-8) based upon the PUCCH format 2 between the paired ACK/NACK and CSI, may be applied herein. For example, virtual pairs may be serially configured starting from the lowest carrier index order and, then, be multiplexed.

For example, when the ACK/NACK and the CSI are transmitted with respect to the transmission over DL CC#1 and DL CC #2, ACK/NACK information, wherein ACK/NACK 1 and ACK/NACK 2 corresponding to the DL CC#1 and the DL CC#2 are bundled, is multiplexed with the CSI 1, thereby being transmitted by using PUCCH format 2a/2b. And, the CSI 2 corresponding to the DL CC#2 transmission may be transmitted by using PUCCH format 2.

Embodiment B-3

Embodiment B-3 of the present invention corresponds to an exemplary multiplexed transmission of the SR and the ACK/NACK. Generally, one PUCCH resource is UE-specifically reserved for the SR. Conversely, for the ACK/NACK, in some cases, diverse (or multiple) information may be required to be transmitted in accordance with the DL transport block (the ACK/NACK information respective to 2 transport blocks within a spatial region may be bound as a 2-bit single information). In this case, the ACK/NACK information may be configured by using PUCCH format 1a (1-bit ACK/NACK) or PUCCH format 1b (2-bit ACK/NACK), and, by performing RS signaling, the ACK/NACK, which is configured as described above, may be transmitted by using a PUCCH resource being configured for the SR. More specifically, when multiplexing the SR and the ACK/NACK information, a method defined in the conventional 3GPP LTE system (e.g., release-8) may be used (see FIG. 10). At this point, the ACK/NACK information being multiplexed with the SR may be configured in advance, prior to being multiplexed with the SR, by performing the following 4 procedures.

Firstly, the ACK/NACK that is multiplexed with the SR may be decided based upon a carrier index order or based upon a direct logical index order respective to the ACK/NACK. For example, among the plurality of ACK/NACK information, the ACK/NACK having the highest index or the ACK/NACK having the lowest index may be multiplexed with the SR (by mapping the ACK/NACK to the SR) so as to be transmitted. The remaining ACK/NACK information may be transmitted in accordance with RRC settings.

Secondly, by bundling the plurality of ACK/NACK, one bundle of ACK/NACK resulting from the bundling process may be multiplexed with the SR. For example, by bundling a plurality of ACK/NACK information to a size of 1 bit or to a maximum size of 2 bits in a Component Carrier (CC) region, a spatial (or spatial codeword) region, or a time (subframe level) region, the ACK/NACK information may be compressed to a maximum size of 2 bits, so as to be transmitted by using the conventional multiplexing method.

Thirdly, when a plurality of bundled ACK/NACK are formed as a result of the process of bundling multiple ACK/NACK into ACK/NACK groups (this may be referred to as partial bundling or group-wise bundling). Herein, the ACK/NACK that is multiplexed with the SR may be decided based upon a carrier index order or based upon a direct logical index order respective to the ACK/NACK. For example, the bundled ACK/NACK having the highest index or the bundled ACK/NACK having the lowest index may be multiplexed with the SR (by mapping the ACK/NACK to the SR) so as to be transmitted. The remaining bundled ACK/NACK information may be transmitted through a transport resource configured in accordance with RRC settings.

Fourthly, based upon the UL CC, which is UE-specifically configured for the SR transmission, an ACK/NACK respective to a DL transport block within a DL CC, which is mapped to the UL CC in accordance with a specific rule, may be multiplexed with the SR (the ACK/NACK information respective to 2 transport blocks within the spatial region may be bound as 2-bit single information). Herein, the specific rule may include a default transmission/reception (Tx/Rx) separation rule, a cell-specific DL/UL CC linkage configuration, or a UE-specific DL/UL CC linkage configuration. For example, only the ACK/NACK, which is designated to a transmission within a DL CC, which is configured to form a linkage with a UL primary carrier, may be multiplexed with an SR and transmitted. And, the remaining ACK/NACK information may be transmitted in accordance with RRC settings.

Embodiment C

Embodiment C of the present invention corresponds to a new a multiplexing method other than the method for multiplexing heterogeneous uplink control information, which is defined in the conventional 3GPP LTE system (e.g., release-8).

Herein, when multiplexing multiple heterogeneous uplink control information through a random PUCCH channel, the multiplexing process may be performed by configuring a mapping (or pair) relation between the heterogeneous uplink control information, the heterogeneous uplink control information being multiplexed based upon a predefined rule (including implicit relation configuration) or a signaling process.

The above-described Embodiment B of the present invention is based on a method for multiplexing PUCCH formats and heterogeneous uplink control information, which are defined in the conventional 3GPP LTE system (e.g., release-8). Conversely, Embodiment C of the present invention corresponds to a method for multiplexing heterogeneous uplink control information based upon the adoption (or application) of a new PUCCH format in the LTE-advanced system.

When the new PUCCH formats being adopted by the LTE-advanced system succeed (or follow) the basic channel structure and CDM/FDM resource multiplexing method from the conventional PUCCH formats 1/1a/1b and PUCCH formats 2/2a/2b, Embodiment C of the present invention proposes the application of a more detailed version of the method for multiplexing heterogeneous uplink control information proposed in Embodiment B.

Meanwhile, even when the new PUCCH formats being adopted by the LTE-advanced system have basic channel structure formats other than the conventional PUCCH formats (1/1a/1b or 2/2a/2b), the more detailed version of the method for multiplexing heterogeneous uplink control information proposed in Embodiment B may be applied as the same logical method by simply varying the targeted PUCCH format. Conversely, a new form of multiplexing method other than the conventional method may also be applied herein. In this case, also, Embodiment C proposes the application of a method of selecting uplink control information, which is designated as the multiplexing target, among the multiple uplink control information proposed in the above-described Embodiment B, a method for performing multiplexing by using information-level compression, and so on, in the new multiplexing method.

Embodiment D

Embodiment D of the present invention proposes a method of adaptively selecting one or more of the above-described multiplexing methods according to Embodiment A, Embodiment B, and Embodiment C of the present invention based upon a specific condition, and applying the adaptively selected method(s). The specific condition may include considering the aspects of the heterogeneous uplink control information that are being multiplexed and concurrently (or simultaneously) transmitted, uplink channel conditions of the user equipment, and/or status of uplink transmission power.

In relation to the above-described Embodiments A to D multiplexing and transmitting heterogeneous uplink control information by using the PUCCH, a case where a plurality of uplink control information corresponding to a specific type is calculated due to the configuration of multiple DL CCs will be additionally described. As described above, when the corresponding uplink control information is expressed or transmitted as a single PUCCH channel, a method of transmitting control information by multiplexing multiple types of the control information or dropping any one of the multiple control information types may be applied based upon the method defined in the conventional 3GPP LTE system (e.g., release-8). Alternatively, if the user equipment does not correspond to a power-limited situation, individual control information may be transmitted within a predetermined UL CC by using an individual PUCCH, i.e., by using multiple PUCCHs.

Embodiment E

In Embodiment E of the present invention, the multiplexing of heterogeneous uplink control information is performed within the PUSCH. At this point, for example, the heterogeneous uplink control information may correspond to different types of uplink control information, such as ACK/NACK, CSI, SR. And, in case multiple DL CCs are being configured, when a plurality of uplink control information corresponds to the same information type is calculated, the heterogeneous uplink control information may indicate control information respective to each of the different DL CCs. The multiplexing between multiple heterogeneous uplink control information within the same uplink subframe over a predetermined UL CC (e.g., UL CC or UL primary carrier configured by the above-described Method 1 or 2) may also be performed within a PUSCH. In Embodiment E of the present invention, the multiplexed transmission of the uplink control information may be performed through a PUSCH resource, regardless of the presence or absence of data that are to be transmitted to the PUSCH.

As a method for multiplexing heterogeneous uplink control information within the PUSCH, a method for multiplexing data and control information within the PUSCH and a method for mapping physical resources to a physical resource block, which are defined in the conventional 3GPP LTE system (e.g., release-8) may be identically applied.

Meanwhile, as another method for multiplexing heterogeneous uplink control information within the PUSCH, the heterogeneous uplink control information may be multiplexed in a MAC message format, thereby being transmitted. At this point, the multiplexed control information may be mapped to a physical resource by using a time-first method with respect to a transport block, and a reliable feedback may be realized through an HARQ. Herein, the physical resource mapping order of the heterogeneous uplink control information may be decided. For example, the physical resource mapping order of the heterogeneous uplink control information may correspond to an order of SR>ACK/NACK>CSI, an order of CSI>ACK/NACK>SR, an order of ACK/NACK>SR>CSI, or an order of SR>CSI>ACK/NACK. The transmission of the SR through the PUSCH may signify that resource within the UL CC is being additionally requested, instead of signifying that the resource within a UL CC, through which the SR is being transmitted, is being requested. As another example, the mapping of physical resources corresponding to individual ACK/NACK information, when transmitting ACK/NACK for the transmission of a downlink PUSCH within multiple DL CCs, each being different from one another, may be performed in a sequential order starting from an ACK/NACK having a low carrier index value of the DL CC. And, conversely, the mapping of the above-described physical resources may also be performed in a sequential order starting from an ACK/NACK having a high DL CC carrier index value. This method may also be identically applied to CSI transmission. At this point, it will be provided that the ACK/NACK or CSI control information respective to different DL CCs are combined to be processed with joint encoding.

Meanwhile, as another method for multiplexing heterogeneous uplink control information within the PUSCH, the heterogeneous uplink control information may be multiplexed to an encoded bit level or to a modulated symbol level within the physical layer, thereby being mapped to the physical resource by using a time-first method. In this case, although the HARQ re-transmission is not performed, in accordance with a different information reliability requirement or quality of service (QoS) for each of the heterogeneous uplink control information, an effective code rate or modulation order may be differently applied for each of the heterogeneous uplink control information. In order to support such application, separate encoding may be separately performed on the different types of heterogeneous uplink control information as well as homogeneous uplink control information. For example, the uplink control information may be differentiated by targeted downlink carrier (i.e., DL CC) units so as to be processed with separate encoding. Herein, the physical resource mapping order of the heterogeneous uplink control information may be decided. For example, the physical resource mapping order of the heterogeneous uplink control information may correspond to an order of SR>ACK/NACK>CSI, an order of CSI>ACK/NACK>SR, an order of ACK/NACK>SR>CSI, or an order of SR>CSI>ACK/NACK. As another example, the mapping of physical resources corresponding to individual ACK/NACK information, when transmitting ACK/NACK for the transmission of a downlink PUSCH within multiple DL CCs, each being different from one another, may be performed in a sequential order starting from an ACK/NACK having a low carrier index value of the DL CC. And, conversely, the mapping of the above-described physical resources may also be performed in a sequential order starting from an ACK/NACK having a high DL CC carrier index value. This method may also be identically applied to CSI transmission. At this point, it will be provided that the ACK/NACK or CSI control information respective to different DL CCs are multiplexed while being separately encoded.

If a random uplink control information is generated in the form of multiple sets of information, in accordance with multiple DL CCs being configured or predetermined with respect to a specific user equipment or relay node corresponding to a random base station, such control information may be configured to be transmitted through a PUCCH being designated by an LTE release-8 system, or a PUCCH format that is newly adopted to an LTE-A system. At this point, essentially, the multiple types of uplink control information, which are pre-defined in the LTE release-8/9 system, may be transmitted by applying a multiplexing method respective to a concurrent transmission situation, or by applying a dropping selection method. Alternatively, as another method for transmitting the control information, if the LTE-A user equipment does not correspond to a power-limited situation, individual uplink control information may be transmitted within a predetermined UL CC by using the method proposed in the present invention, according to which the uplink control information may be transmitted through a PUCCH resource by using individual PUCCHs.

All of the methods, which are proposed in the description of the present invention, may be applied as an uplink control information transmission method within an uplink between a base station and a relay node or an uplink between a relay node and a user equipment located within a relay region, in addition to an uplink between a base station and a user equipment.

Figure 15:
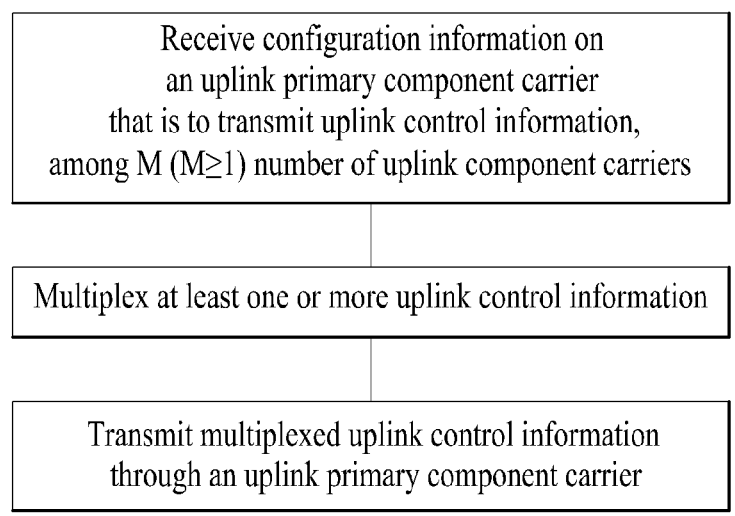
FIG. 15 illustrates a flow chart showing the process steps of a method for transmitting uplink control information according to an embodiment of the present invention.

FIG. 15 illustrates a flow chart showing the process steps of a method for transmitting uplink control information according to an embodiment of the present invention. A method for multiplexing and transmitting uplink control information in a wireless communication system supporting carrier aggregation (CA) of M (M≥1) number of uplink component carriers, will also be described with reference to FIG. 15. The method of FIG. 15 may be performed by an uplink transmission entity (user equipment or relay station). Herein, an example of the method of the present invention being performed by the user equipment will be given in the following description.

Prior to performing step 1510, after performing a process step of configuring an RRC connection (cell search process, system information acquisition/reception process, initial random access process, and so on) based upon a single random CC for each of the DL and UL through an initial access or initial deployment process of the user equipment, unique carrier configuration specific to each user equipment may be received from the base station via dedicated signaling (UE-specific RRC signaling or UE-specific L1/L2 PDCCH signaling) (not shown).

In step 1510, a step of receiving configuration information for an uplink component carrier, through which uplink control information is to be transmitted, among M number of uplink component carriers, is performed. Herein, the M number of uplink component carriers may correspond to a number of uplink component carriers, which are configured by the base station, or may correspond to UL CCs that are uniquely configured for the user equipment. More specifically, the uplink primary component carrier may be configured of any one of uplink component carriers that are configured by the base station, and uplink component carriers that are uniquely configured for the user equipment. Additionally, although the uplink primary component carrier may simply be defined as uplink control information being transmitted as an uplink component carrier (in this case, the transmission of the uplink control information through PUCCH and/or PUSCH may also be included), the uplink primary component carrier may also be defined as an uplink component carrier transmitting uplink control information through a PUCCH). Also, the uplink primary component carrier may be configured as a single uplink component carrier specifically designated to an uplink transmission entity (user equipment or relay station). Furthermore, configuration information on the uplink primary component carrier may be received by using explicit signaling (RRC signaling or L1/L2 control signaling). Such configuration information on the uplink primary component carrier may correspond to information directly configuring the uplink primary component carrier, or to information being indirectly drawn (or deduced) from information configuring a downlink primary component carrier (based upon a DL/UL linkage configuration). Detailed description of the method for configuring an uplink primary component carrier will be in accordance with the various embodiments of the present invention that are described above.

In step 1520, a step of multiplexing at least one or more of the uplink control information is performed. The process of multiplexing at least one or more of the uplink control information includes multiplexing at least one or more of the uplink control information through a physical uplink control channel (PUCCH) or through a physical uplink shared channel (PUSCH). The uplink control channel, which corresponds to a multiplexing target, may correspond to at least one or more of ACK/NACK information, channel status information (CSI), and scheduling request (SR). Also, the process of multiplexing uplink control information may include multiplexing homogeneous uplink control information and multiplexing heterogeneous uplink control information. Detailed description of the method for multiplexing uplink control information will be in accordance with the various embodiments of the present invention that are described above.

In step 1530, a step of transmitting the multiplexed uplink control information through the uplink primary component carrier, which is configured as described above, is performed.

Figure 16:
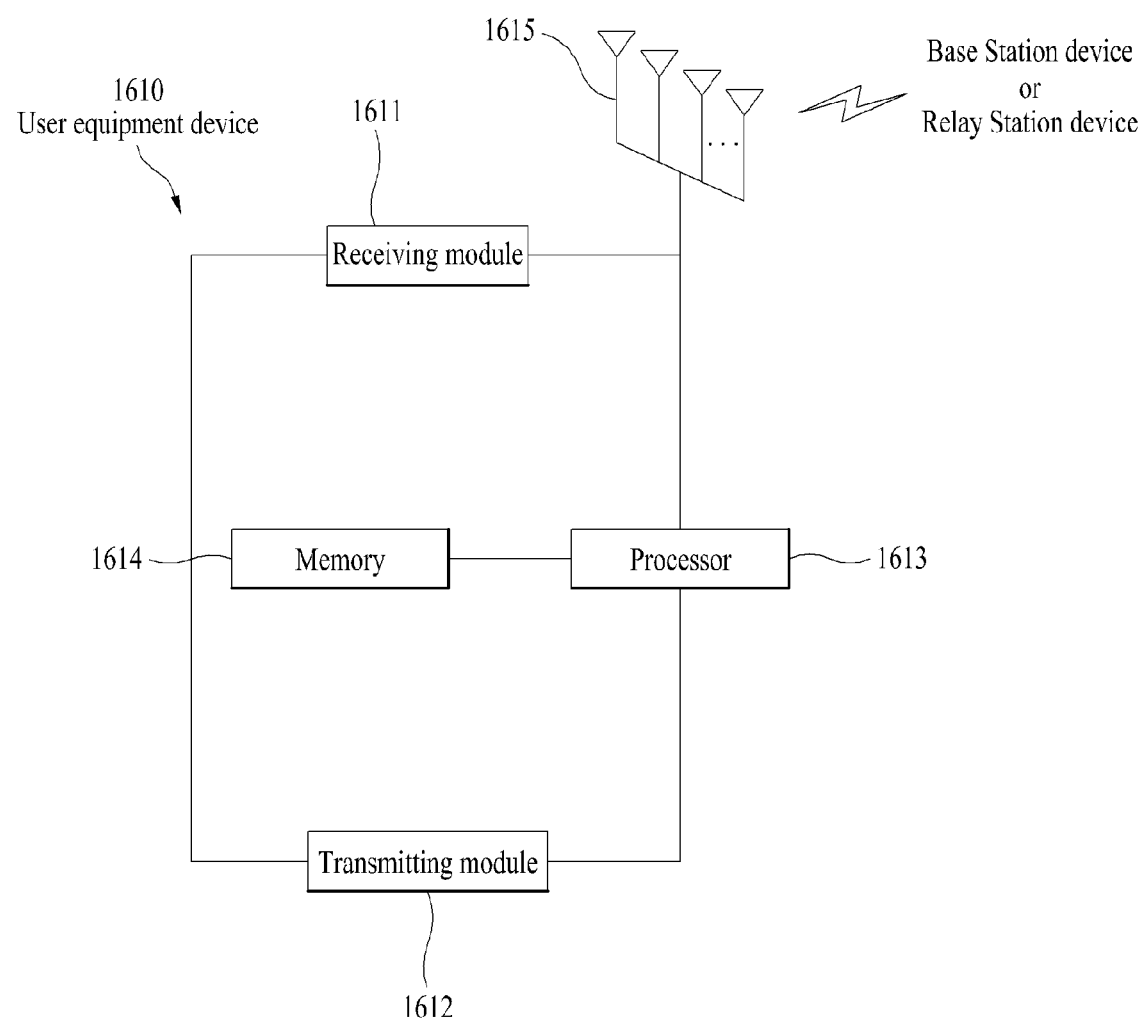
FIG. 16 illustrates an exemplary configuration of a user equipment device according to an embodiment of the present invention.

FIG. 16 illustrates an exemplary configuration of a user equipment device according to an embodiment of the present invention.

The user equipment device (1610) may include a receiving module (1611), a transmitting module (1612), a processor (1613), a memory (1614), and an antenna (1615). The receiving module (1611) may perform a function of receiving diverse data and control singles from an external source (e.g., base station or relay station). The transmitting module (1612) may perform a function of transmitting diverse data and control singles to the external source (e.g., base station or relay station). The processor (1613) is configured to be connected to the various components of the user equipment device (1610), such as the receiving module (1611), the transmitting module (1612), the memory (1614), and so on, so as to be in communication with such components. And, the processor (1613) is also configured to control the overall operations of the user equipment device (1610) and its components. Herein, the reception and transmission of data and control information according to the MIMO transmission scheme of the user equipment device (1610) may be supported by using the antenna unit (1615), which is configured of multiple antennae.

The user equipment device (1610) according to the exemplary embodiment of the present invention may multiplex and transmit uplink control information in a wireless communication system supporting carrier aggregation of M (M≥1) number of uplink component carriers. The processor (1613) of the user equipment device (1610) may be configured to receive configuration information respective to an uplink primary component carrier, through which uplink control information is to be transmitted, among the M number of uplink component carriers, by using the receiving module (1611). The processor (1613) may also be configured to multiplex at least one or more of the uplink control information. Furthermore, the processor (1613) may also be configured to transmit the multiplexed uplink control information through the uplink primary component carrier by using the transmitting module (1612). When performing the operations of the user equipment device (1610), the method for configuring the uplink primary component carrier, the method for multiplexing diverse uplink control information, and so on, may be performed according to the various exemplary embodiments of the present invention.

Additionally, the processor (1613) of the user equipment device (1610) may also perform the function of performing calculation processing on the information received by the user equipment device and on the information that are to be transmitted to an external source. And, the memory (1614) may store the calculation-processed information for a predetermined period of time. And, the memory (1614) may also be replaced with another component, such as a buffer (not shown).

Although FIG. 16 mainly illustrates the user equipment device (1610) as the uplink transmission entity and mainly illustrates the base station or the relay station as the uplink reception entity, it will be apparent that the above-described details may be identically applied to a case when the relay node (RN) device acts as the uplink transmission entity, and when the base station device acts as the uplink reception entity, in accordance with FIG. 16.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The present invention may be applied in diverse types of wireless mobile communication systems.

The invention claimed is:

1. A method for transmitting uplink control information in a wireless communication system supporting carrier aggregation of M uplink component carriers, where M is an integer greater than one, the method comprising:
receiving configuration information for an uplink primary component carrier; multiplexing ACK/NACK information with a scheduling request (SR); and
transmitting, in a single subframe, the multiplexed information through the uplink primary component carrier among the M uplink component carriers,
wherein the uplink primary component carrier is an uplink component carrier for transmitting the multiplexed information through a physical uplink control channel (PUCCH) among the M uplink component carriers,
wherein the transmission of the multiplexed information through the PUCCH is allowed only through the uplink primary component carrier, and is not allowed through uplink component carriers other than the uplink primary component carrier, and
wherein the PUCCH is not simultaneously transmitted along with a physical uplink shared channel (PUSCH) in a single subframe.

2. The method of claim 1, wherein the uplink primary component carrier is configured as a single uplink transmission entity-specific uplink component carrier.

3. The method of claim 1, wherein the configuration information is received through RRC signaling or L1/L2 control signaling.

4. The method of claim 1, wherein the configuration information is information directly configuring the uplink primary component carrier, or information being indirectly derived from information configuring a downlink primary component carrier.

5. A user equipment for transmitting uplink control information in a wireless communication system supporting carrier aggregation of M uplink component carriers, where M is an integer greater than one, the user equipment comprising: a receiving unit configured to receive downlink signals; a transmitting unit configured to transmit uplink signals; and
a processing unit configured to be connected to the receiving unit and the transmitting unit and to control operations of the user equipment,
wherein the processor is further configured to:
receive configuration information for an uplink primary component carrier, by using the receiving unit,
multiplex ACK/NACK information with a scheduling request (SR), and
transmit, in a single subframe, the multiplexed information through the uplink primary component carrier among the M uplink component carriers, by using the transmitting unit,
wherein the uplink primary component carrier is an uplink component carrier for transmitting the multiplexed information through a physical uplink control channel (PUCCH) among the M uplink component carriers,
wherein transmission of the multiplexed information through the PUCCH is allowed only through the uplink primary component carrier, and is not allowed through uplink component carriers other than the uplink primary component carrier, and
wherein the PUCCH is not simultaneously transmitted along with a physical uplink shared channel (PUSCH) in a single subframe.

\* \* \* \* \*